(12) United States Patent
Guy et al.

(10) Patent No.: US 10,988,951 B2
(45) Date of Patent: Apr. 27, 2021

(54) DISPENSING SYSTEM

(71) Applicant: King Technology Inc., Hopkins, MN (US)

(72) Inventors: David Guy, Maple Grove, MN (US); Terry Goeman, Minnetonka, MN (US); Jeffrey Johnson, Edina, MN (US); Paul Freeberg, South St. Paul, MN (US); Lyle Enderson, Anoka, MN (US); Darrin M. Swagel, Minnetonka, MN (US); Eric Barton, Eden Prairie, MN (US)

(73) Assignee: KING TECHNOLOGY INC., Hopkins, MN (US)

( * ) Notice: Subject to any disclaimer, the term of this patent is extended or adjusted under 35 U.S.C. 154(b) by 0 days.

(21) Appl. No.: 16/059,977

(22) Filed: Aug. 9, 2018

(65) Prior Publication Data
US 2019/0048604 A1  Feb. 14, 2019

Related U.S. Application Data

(60) Provisional application No. 62/564,620, filed on Sep. 28, 2017, provisional application No. 62/544,173, filed on Aug. 11, 2017.

(51) Int. Cl.
*E04H 4/12* (2006.01)
*B01F 1/00* (2006.01)
*B01F 5/10* (2006.01)

(52) U.S. Cl.
CPC ......... *E04H 4/1281* (2013.01); *B01F 1/0027* (2013.01); *B01F 5/106* (2013.01)

(58) Field of Classification Search
CPC ....... E04H 4/1281; B01F 5/106; B01F 1/0027
USPC .......... 210/167.11, 167.12, 167.19, 205, 206
See application file for complete search history.

(56) References Cited

U.S. PATENT DOCUMENTS

| | | | |
|---|---|---|---|
| 5,124,032 A | 6/1992 | Newhard | |
| 5,234,588 A | 8/1993 | Arms | |
| 5,236,581 A * | 8/1993 | Perry | ..................... B01D 29/21 210/130 |
| 6,328,900 B1 | 12/2001 | King | |
| 8,431,021 B2 * | 4/2013 | McCague | ............... C02F 1/001 210/167.11 |
| 8,961,782 B2 | 2/2015 | Berkey | |
| 9,446,336 B2 | 9/2016 | Huda et al. | |
| 2001/0045380 A1 * | 11/2001 | Khan | ..................... C02F 1/008 210/85 |
| 2005/0211613 A1 * | 9/2005 | King | ........................ C02F 1/688 210/167.11 |
| 2011/0000838 A1 | 1/2011 | Lawson et al. | |
| 2012/0074052 A1 * | 3/2012 | Brandreth | ............ B01D 37/025 210/206 |

FOREIGN PATENT DOCUMENTS

CA        2981181 A1 *  10/2006

* cited by examiner

*Primary Examiner* — Fred Prince
(74) *Attorney, Agent, or Firm* — Johnson & Phung LLC

(57) ABSTRACT

A filter well mountable dispenser holder securable within a hot tub filter well with the dispenser holder supporting replaceable dispersant containing dispensing cartridges positionable within a circulating flow of water through the filter well to thereby release dispersants therefrom without preventing the circulating flow of water from passing through the filter media proximate the dispensing cartridges.

8 Claims, 17 Drawing Sheets

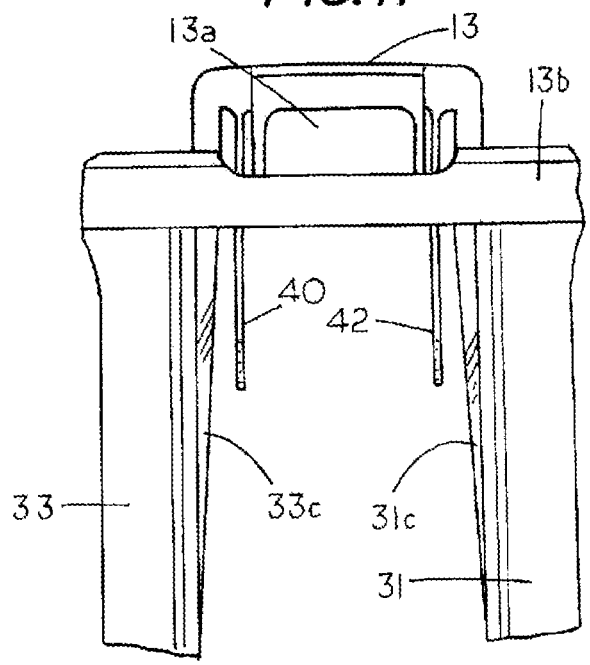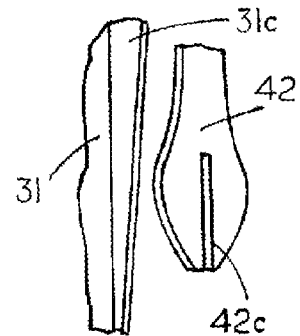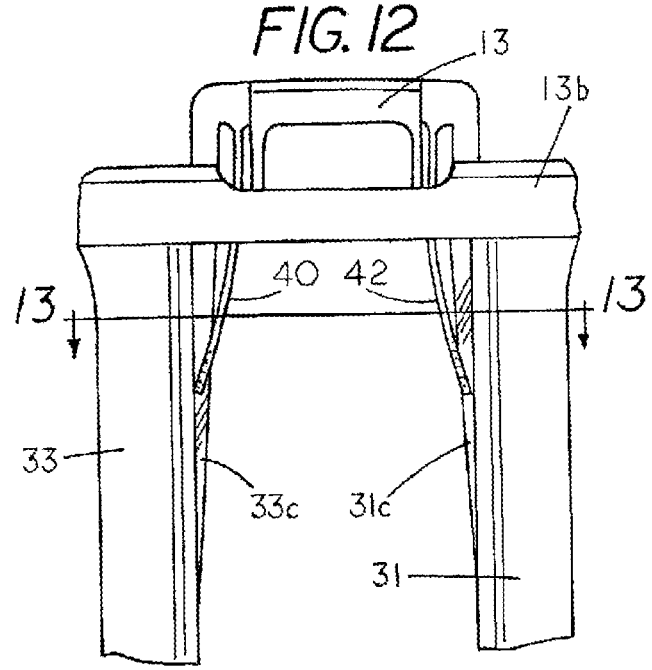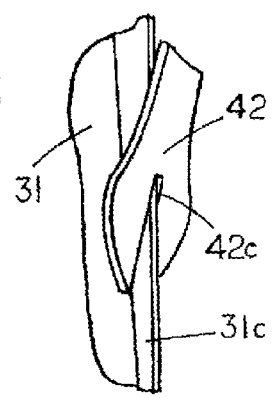

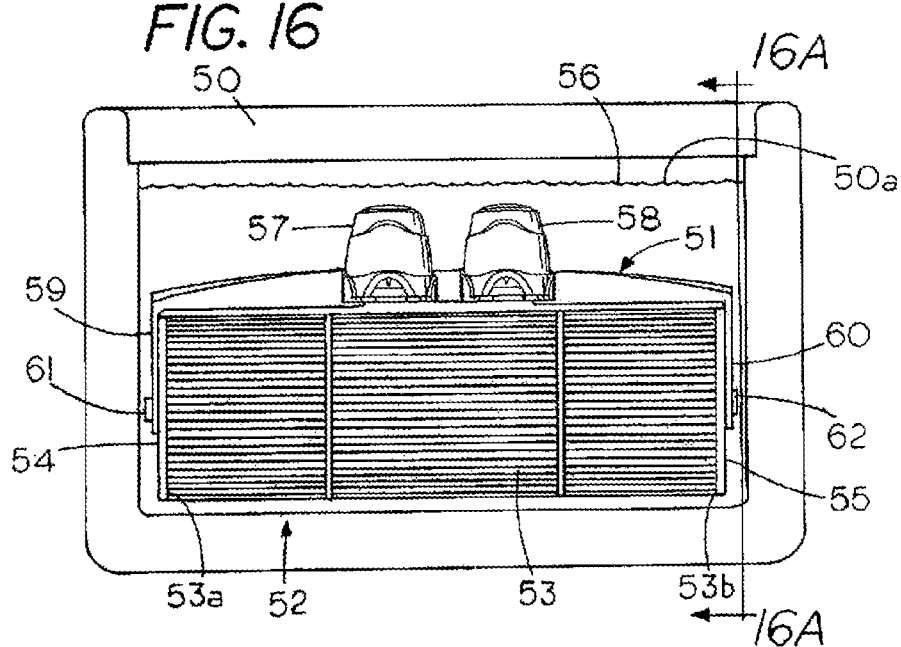
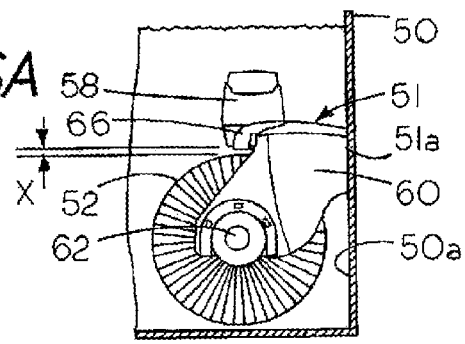
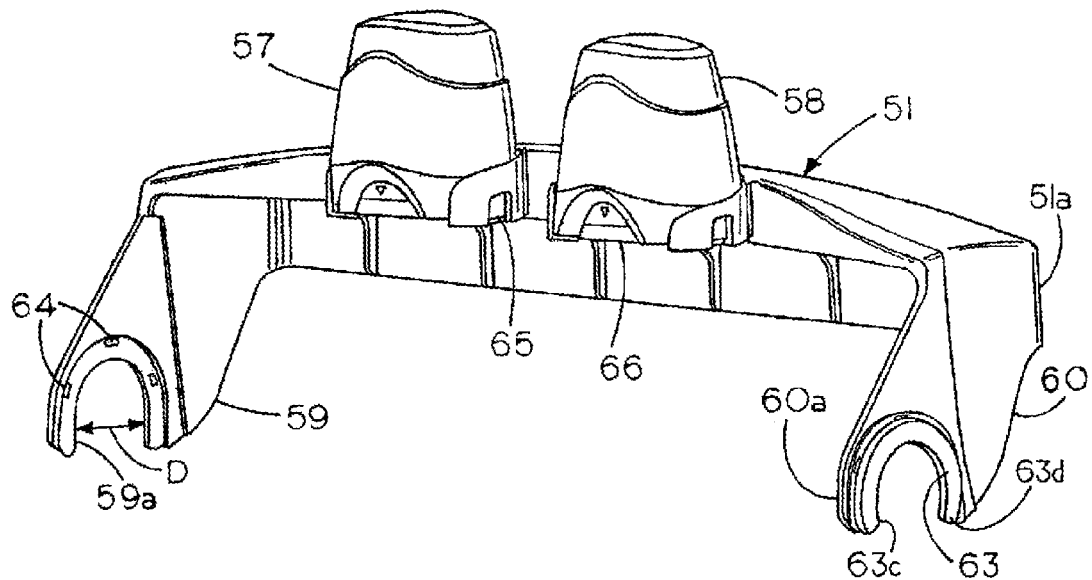

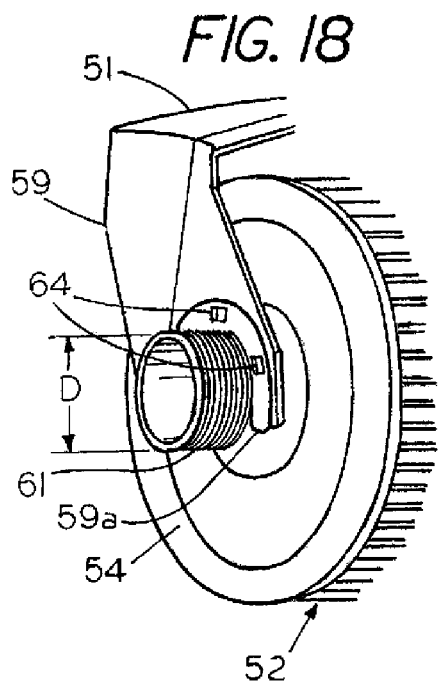
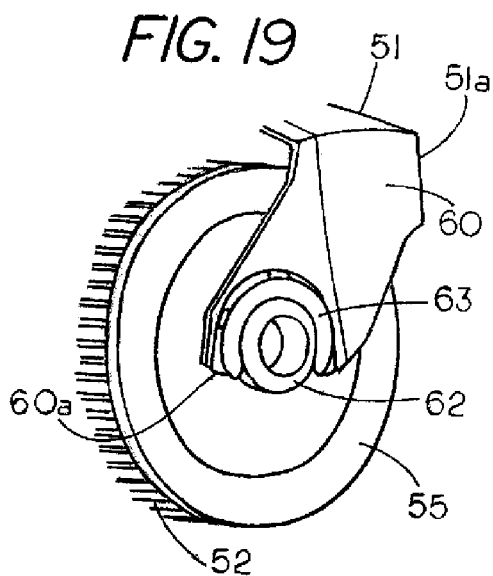
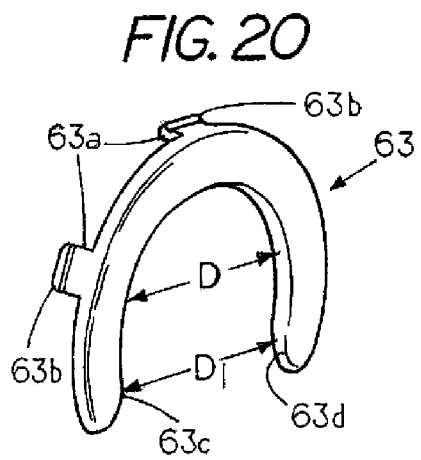
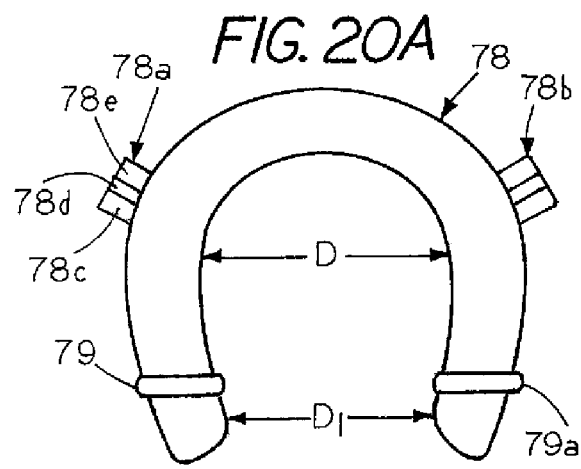
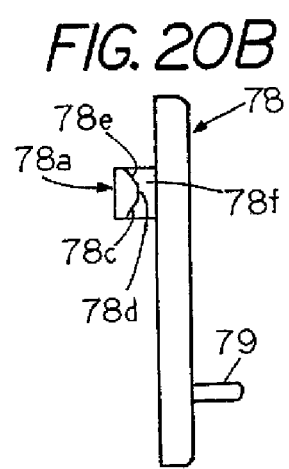
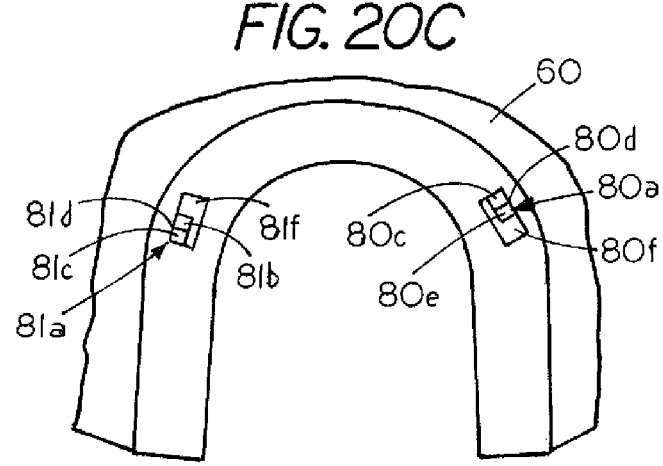

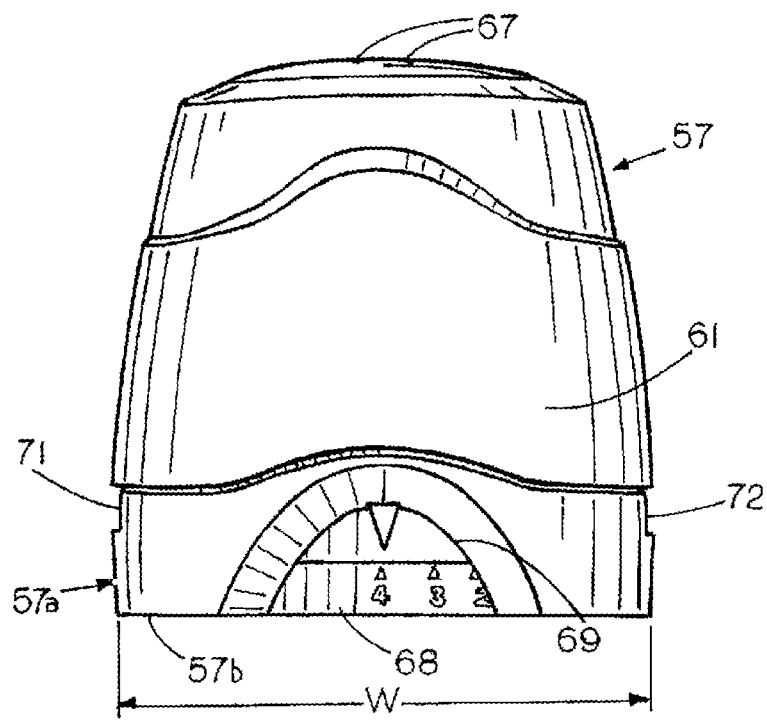
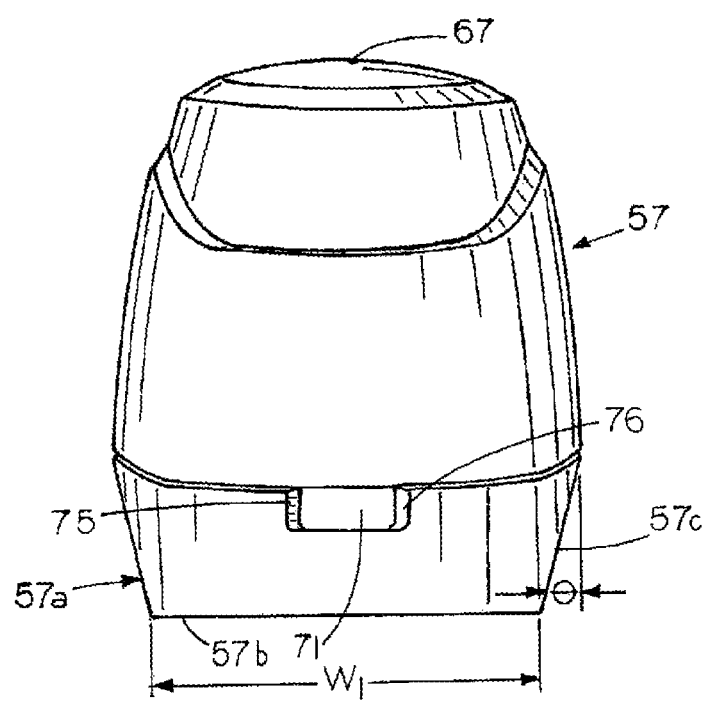

DISPENSING SYSTEM

CROSS REFERENCE TO RELATED APPLICATIONS

This application claims priority from provisional application Ser. No. 62/544,173 filed Aug. 11, 2017 and provisional application Ser. No. 62/564,620 filed Sep. 28, 2017.

STATEMENT REGARDING FEDERALLY SPONSORED RESEARCH OR DEVELOPMENT

None

REFERENCE TO A MICROFICHE APPENDIX

None

STATEMENT REGARDING FEDERALLY SPONSORED RESEARCH OR DEVELOPMENT

None

BACKGROUND OF THE INVENTION

The use of dispensers that release a disperant or dispersants into the water in a hot tub or the like to maintain the water, which recirculates within the hot tub, in a user friendly condition is well known. In one example a dispenser, which contains one or more dispersants, floats in the hot tub and releases disperant into the water through water contact with the dispersant within the dispenser. In another example a dispenser containing one or more disperant is installed in an internal pipeline of the hot tub water circulation system. In still another example a stick shaped dispenser is either inserted into the core of a filter cartridge, where it is free rattle around as water flows through the filter core, or the stick shape dispenser may be extended perpendicularly outward from the underside of a skimmer basket. Thus various devices have been employed to deliver dispersants into a hot tub that may require modification to the hot tub or the devices may integrated into components of hot tub, which in some cases makes it difficult or time consuming to replace a dispenser once the dispersant therein is consumed. In other cases the output of a dispenser placed in the filter well may become erratic due to instability of its position in the filter well or in other cases to the instability of flow past the dispenser, which may alter the output of the dispenser.

Typically, hot tubs or the like have a filter well coupled to a recirculating water system that circulates water through the filter well, which contains a filter cartridge that removes debri from the water as the water flows through the filter cartridge. A weir gate or similar device separates the filter well from the area occupied by the hot tub users. Since the filter well, which contains a filter cartridge, is located outside of the main hot tub sitting area it becomes a convenient location for placing a dispenser therein so as not to interfere with the persons using the hot tub. Although a convenient location a dispensing cartridge placed therein should not prevent a normal flow of water through the filter media while retaining the ability to effectively deliver dispersant into the recirculating water. In addition the dispensing cartridge should be easily replaceable once the dispersant in the dispensing cartridge has been consumed.

SUMMARY OF THE INVENTION

A filter well dispensing system including a filter well mountable dispenser holder securable within a hot tub filter well with the dispenser holder supporting at least one replaceable dispensing cartridge within a circulating flow of water that flows through the filter well with the dispenser holder and the at least one replaceable dispensing cartridge held in a spaced condition proximate a filter media by the dispenser holder to thereby release dispersants from the dispensing cartridges thereon into the circulating flow of water without preventing the circulating flow of water from flowing through a portion of filter media located proximate the dispenser holder.

BRIEF DESCRIPTION OF THE DRAWINGS

FIG. 11 is a partial front view of the dispenser holder of FIG. 6A showing a set of resilient latching fingers and adjacent ribs on the dispenser holder;

FIG. 11A is an isolated perspective view of one of the set of resilient latching fingers and one of the ribs on the dispenser holder of FIG. 6A showing the relationship of a resilient latching finger to a rib on the dispenser holder;

FIG. 12 is a side view illustrating the flexing of resilient latch fingers as they bend past a rib on the dispenser holder;

FIG. 12A is a perspective view showing the relationship of a resilient latching finger of FIG. 12 to an adjacent rib on the dispenser holder;

FIG. 16 is a front view of a filter well of a hot tub with a filter well dispenser holder and dispensing cartridges proximate a filter media of a horizontal extending filter cartridge;

FIG. 16A is a side view of the filter well with dispenser holder and dispensing cartridges of FIG. 16 taken along lines 16A-16a of FIG. 16;

FIG. 17 is a perspective view of the filter well dispenser holder and dispensing cartridges of FIG. 16;

FIG. 18 is a partial perspective view showing one end of the filter well dispenser holder of FIG. 17 in engagement with a filter end cap of a filter cartridge;

FIG. 19 is a perspective view showing another end of the filter well dispenser holder of FIG. 17 in engagement with a second end of the filter cartridge;

FIG. 20 is a perspective view of an end adapter for the filter well dispenser holder of FIG. 17;

FIG. 20A is a front view of an end adapter for the filter well dispenser holder of FIG. 17;

FIG. 20B is a side view of the end adapter of FIG. 20A;

FIG. 20C is a partial view of an offset radial arm having a set of latches for engaging the end adapter of FIG. 20A:

FIG. 21 is a front view of a dispensing cartridge rotationally mountable in the filter well dispenser holder of FIG. 17;

FIG. 22 is a side view of a dispensing cartridge of FIG. 21;

DESCRIPTION OF THE PREFERRED EMBODIMENTS

Figure 1:
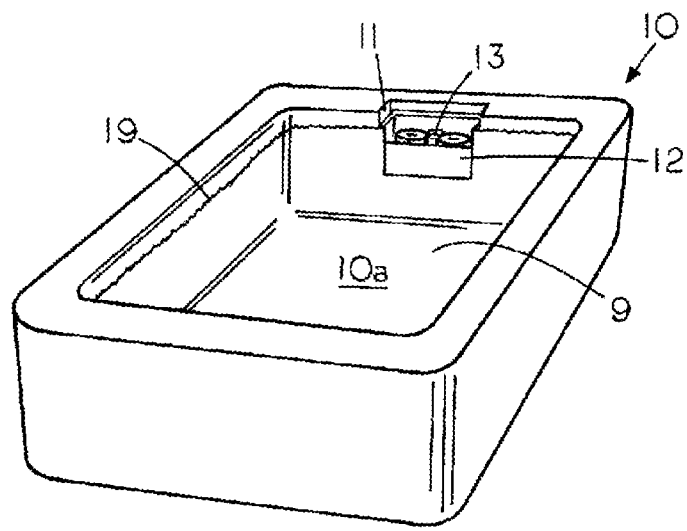
FIG. 1 is a perspective view of a hot tub with a filter well mountable dispenser holder located in the filter well of the hot tub.

FIG. 1 is a perspective view of a hot tub 10 with an underwater dispenser holder 13 located in a filter well 11, which is an integral component of hot tub 10. A weir gate 12 separates the filter well 11 from a seating area 9 in water chamber 10a.

Figure 2:
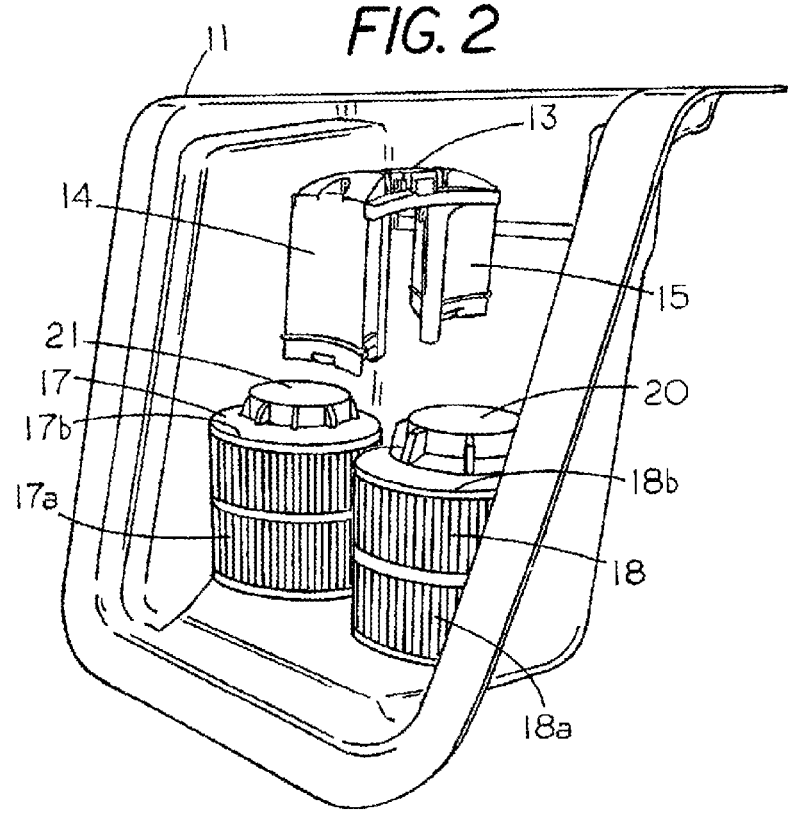
FIG. 2 is an isolated perspective view of the filter well of FIG. 1 showing the filter well mountable dispenser holder with dispensing cartridges positioned above two vertical extending filter cartridges.

FIG. 2 is an isolated perspective view of the hot tub filter well 11 showing a filter well mountable dispenser holder 13 in an insert position above a top end of filter cartridge 17 and a top end of filter cartridge 18. Dispenser holder 13 comprises a frictionally mountable dispensing dispenser holder that carries a first dispensing cartridge 14 and a second dispensing cartridge 15, which are also shown located above the end mount upright filter cartridges 17 and 18. In the insert position shown the dispenser holder 13 can be lowered onto and attached to a filter end cap 17a and to filter end cap 17b with the two filter caps supporting the dispenser holder 13 and the dispensing cartridges 14 and 15 in a proximate by spaced condition from cylindrical filter media 17a and cylindrical filter media 18a. The maintaining of a spaced condition of the dispensing cartridges 14 and 15 from the filter media 17a and 18a permits dispersant dispensing from dispensing cartridges 14 and 15 without blocking of the flow of circulating water through the cylindrical filter media 17a or the cylindrical filter media 18a. Thus, a feature of the invention is that the circulation of fluid through the filter media 17a and 18a proximate the dispenser holder and dispensing cartridges can be maintained when the dispenser holder and dispensing cartridges are mounted as shown since the dispensing cartridges 14 and 15 as well as the portion of the dispenser holder 13 located proximate the filter media while located in the filter well are spaced from the filter media 17a and 18a so as not to block the flow of water into a portion of the filter media that is radially spaced from both the dispensing cartridges and the dispenser holder. The circulating water flowing through the filter media creates a stable flow condition proximate the area dispensing cartridges thereby eliminating instabilities that occur with free floating dispensers in a filter well. A further feature of the invention is that the dispenser holder 13 and dispensing cartridges 14 and 15 are after market devices that are compatible with the structures of an existing hot tub filter well and as such require no tools or modifications to the hot tub filter well thus making the dispenser holder and dispensing cartridges suitable for a consumer to attach or remove from the filter well without the use of special tools.

In operation of the hot tub 10 either with or without the dispenser holder 13 and dispensing cartridges 14 and 15 water flows radially inward through the cylindrical filter media 17a of the end mounted filter cartridge 17 and radial inward through an identical cylindrical filter media 18a in filter cartridge 18. In this example the two filter cartridges 17 and 18 are located in a side by side position but spaced from each other to allow a circulating flow of water to flow radially into and through the cylindrical filter media 17a and the cylindrical filter media 18a to filter the water and remove contaminants such as debri or bacteria from the water. Once the contaminants are removed the filtered water discharges into the hot tub from a return passage located in the core or center of each of the filter cartridges.

FIG. 2 shows a filter retaining cap 21 engaging a filter end cap 17b to fixedly hold filter cartridge 17 in a flow filtering position within filter well 11 and, similarly, a filter retaining cap 20 engages a filter end cap 18b to fixedly hold filter cartridge 18 in a flow filtering position within the filter well 11. FIG. 2 shows dispenser holder 13 supporting replaceable dispensing cartridges 14 and 15, in the insert position where the dispenser holder 13 with the dispensing cartridges 14 and 15 thereon can be hand inserted downward into an open or free space between adjacent filter cartridges 17 and 18 by grasping holder 13 with the fingers of one hand. As shown filter cartridge 17 includes an annular pleated filter media 17a and filter cartridges 18 includes an annular pleated filter media 18a which allows water entering the filter well to flow radially inward through filter media 17a and filter media 18a while preventing contaminants from flowing therethrough.

Figure 3:
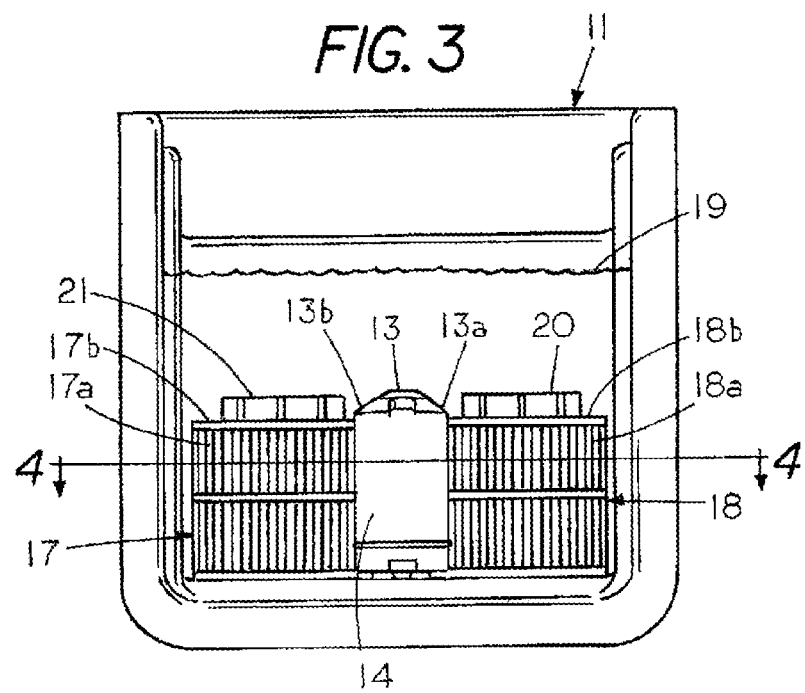
FIG. 3 is a front view showing the dispenser holder with the dispensing cartridges engaged with adjacent filter cartridges in the filter well.

FIG. 3 is an isolated front view of filter well 11 showing dispenser holder 13 with dispensing cartridges 14 and 15 in a dispensing condition proximate the filter media 17a of filter cartridge 17 and proximate the filter media 18a of filter cartridge 18. The filter cartridge 17 and filter cartridge 18 as well as the dispenser holder 13 and the dispensing cartridges 14 and 15 are located below a water line 19 to enable dispersants in dispensing cartridges 14 and 15 to be released into the circulating flow of water in the hot tub as contaminants are removed from the water through the filter cartridges 17 and 18. In this example an arcuate lip 13a on one side of housing of dispenser holder 13 engages top end cap 18b and a second arcuate lip 13b on the opposite side of housing of dispenser holder 13 engages top end cap 17b to support dispenser holder 13 thereon.

Figure 4:
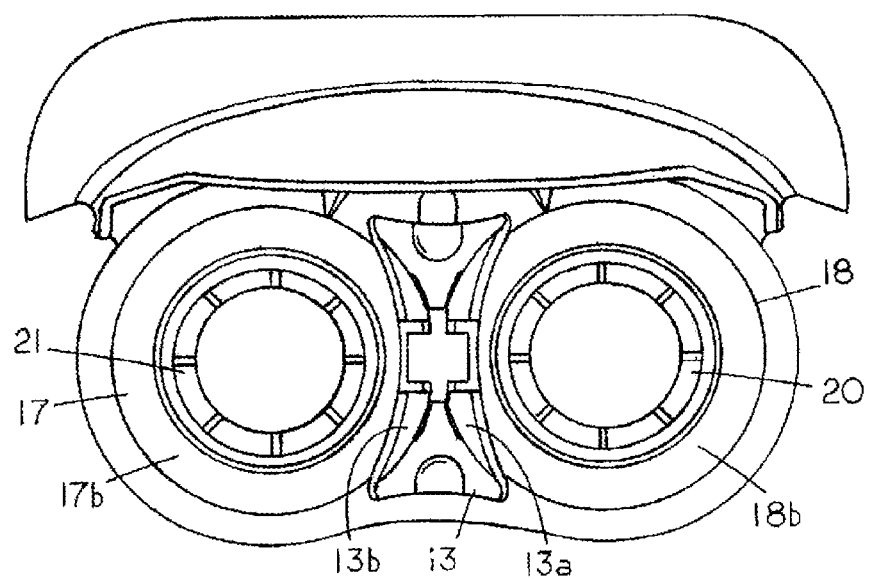
FIG. 4 is a top view showing the dispenser holder and dispensing cartridges located proximate the filter media of adjacent filter cartridges.

FIG. 4 is a top view showing dispenser holder 13, which is vertically supported on filter end cap 17b by the first arcuate lip 13b that is part of dispenser holder 13 and vertically supported on filter end cap 18b by the second arcuate lip 13b, which is also a part of dispenser holder 13. In this example the top surface of filter end cap 17b and the top surface of end cap 18b vertically support dispensing holder to 13 maintain the dispensing cartridge 14 and the dispensing cartridge 15 in a spaced vertically fixed condition proximate the filter media 17a and the filter media 18a. As described hereinafter the end cap 17b and end cap 18b frictionally engage latching members 40 and 42 (shown in FIG. 6A) to maintain the dispenser holder 13 and dispensing cartridges 14 and 15 in a stable and fixed dispensing condition proximate filter cartridge 17 and filter cartridge 18. A feature of the invention is that the dispensing cartridges are fixedly positioned in a more stable flow region of the circulating water stream proximate the filter media 17a and 18a. Consequently, since the dispensing cartridges 14 and 15 are mounted in a more stable flow region proximate the filter media 17a and filter media 17b the flow past the dispensing cartridge 14 and dispensing cartridge 15 remains more uniform and less subject to water flow disturbances. Thus, a feature of the invention is that it virtually eliminates adverse effects one may experience with free floating or unsecured dispensers or for example secured dispensers that are attached to weir gates since such fixed devices are subject to water flow perturbations or water flow disturbances that may effect the dispensing rate of the dispensers.

Figure 4A:
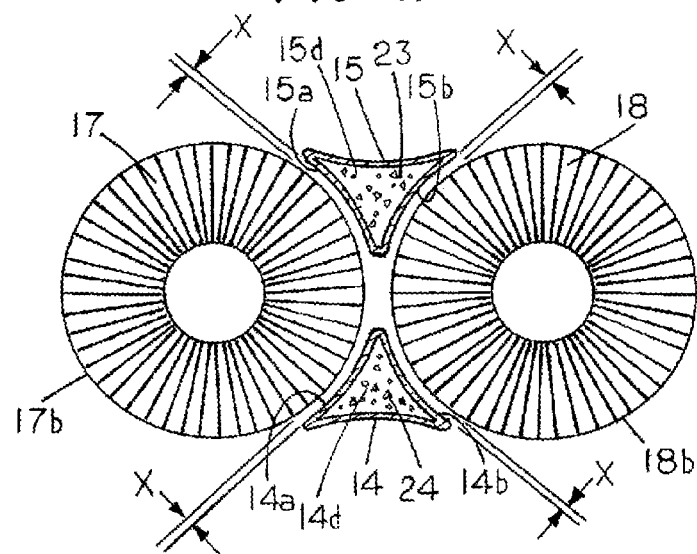
FIG. 4A is a cross sectional view showing the dispensing cartridges located proximate the filter media of adjacent filter cartridges.

FIG. 4A is a sectional view taken along lines 4-4 of FIG. 3 showing dispenser holder 13 and dispensing cartridges 14 and 15 located in a spaced condition between filter cartridge 17 and filter cartridge 18. Dispensing cartridge 14 contains a dispersant 24 and dispensing cartridges 15 contains a dispersant 23. FIG. 4A shows lateral arcuate spacing between filter cartridges 18 and dispensing cartridge 14 and 15 that forms a gap of width x between the exterior convex surface of pleated filter media 18b and concave side surface 14b of dispensing cartridge 14 and concave side surface 15b of dispensing cartridge 15. Similarly, FIG. 4A shows the lateral arcuate spacing forms a first gap of width x between the exterior convex surface of filter media 17b and concave side surface 14a of dispensing cartridge 14 and a second gap of width x between a concave side surface 15b of dispensing cartridge 15 and a convex surface of filter media 18b. The width of the gap, which is denoted by x, is sufficient so that water can flow within the gap therebetween and through the portion of the filter media located proximate the dispensing holder 13 when the dispensing cartridges are mounted on holder 13. As shown the dispenser holder 20 positioning allows the hot tub water circulation system to circulate the water past the dispensing cartridges 14 and 15 that are fixedly mounted within a stable flow region of the filter well 11. Thus, a feature of the fixed placement of dispenser holder 20 and dispensing cartridges 14 and 15 proximate the filter media, as shown in FIG. 4A, is that the dispensing cartridges are supported in the flow region proximate the filter media 17b and filter media 18b, a flow region that remains relatively stable since the circulating water exits from the filter well through the filter cartridges 17 and 18 before the filtered water is returned to the hot tub.

Figure 5:
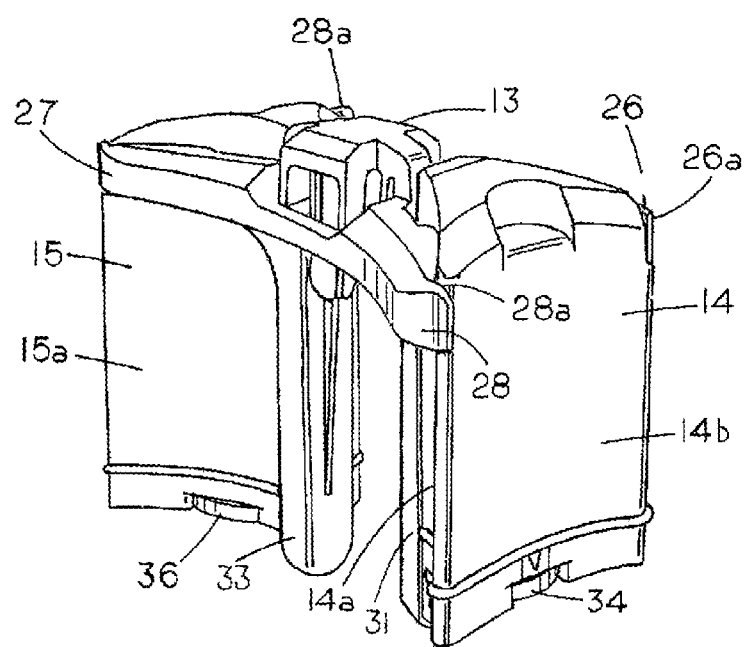
FIG. 5 is a perspective view of the dispenser holder with two dispensing cartridges secured thereto.
Figure 6:
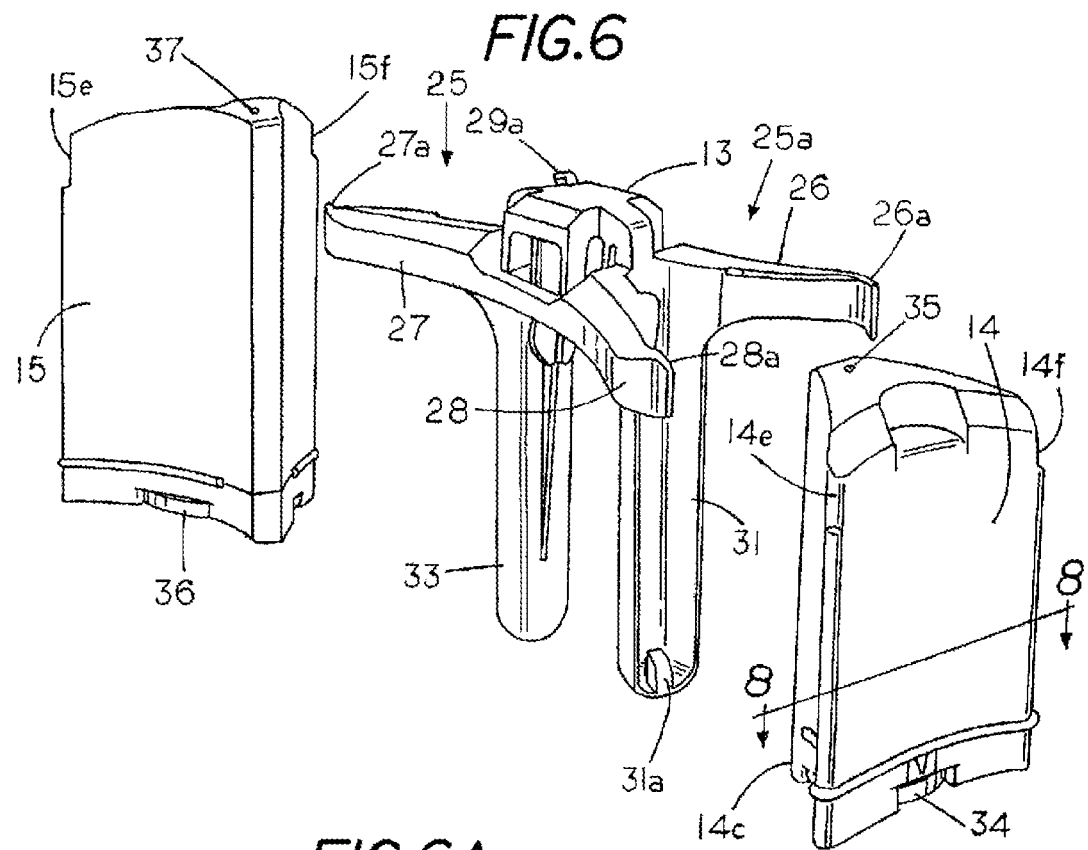
FIG. 6 is an exploded view of the dispenser holder and the dispensing cartridges of FIG. 5.

FIG. 5 is a perspective assembled view of the dispenser holder 13 with a first snap-in dispensing cartridge 14 attached to one side of dispenser holder 13 and a second snap-in dispensing cartridge 15 attached to an opposite side of dispenser holder 13 while FIG. 6 is an exploded view of the dispenser holder 13, the dispensing cartridge 14 and dispensing cartridge 15. In the assembled condition shown in FIG. 5 the dispensing cartridges 14 and 15 together with dispenser holder 13 can be hand inserted as a unit into the space between filter cartridges 17 and 18.

Figure 6A:
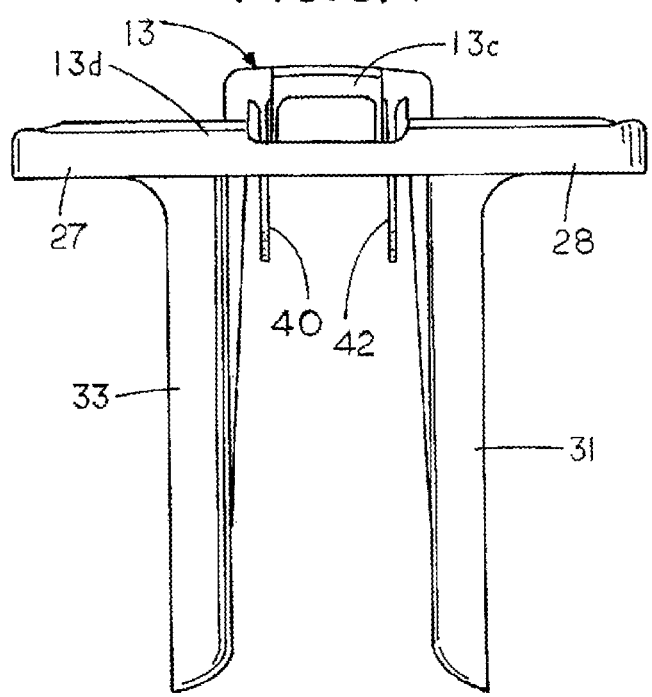
FIG. 6A is a front view of the dispenser holder of FIG. 6 without any dispensing cartridges attached thereto.
Figure 6B:
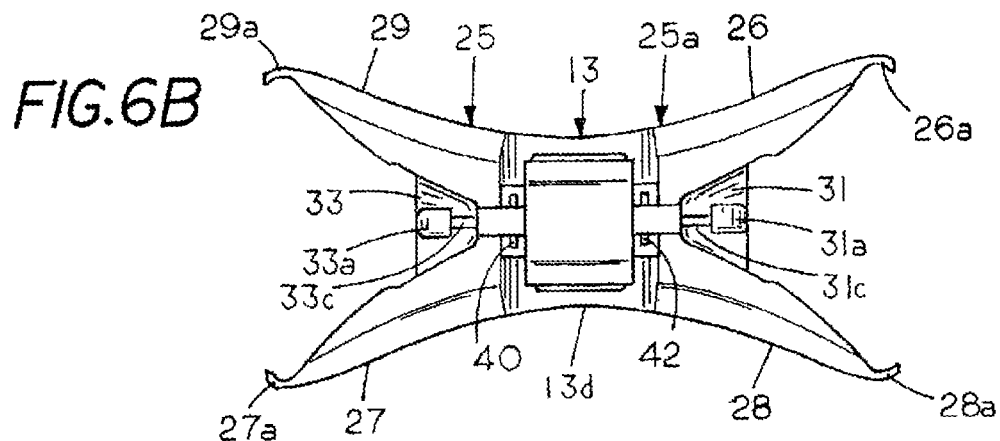
FIG. 6B is a top view of the dispenser holder of FIG. 6 without any dispensing cartridges attached thereto.
Figure 6C:
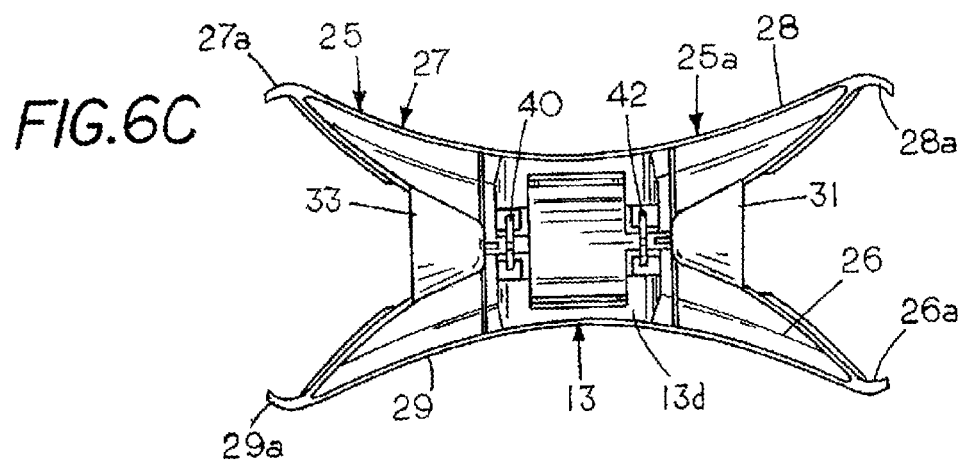
FIG. 6C is a bottom view of the dispenser holder of FIG. 6 without any dispensing cartridges attached thereto.

FIG. 6 is a perspective view of dispenser holder 13, FIG. 6A is a front view of dispenser holder 13 with a top base 13d, FIG. 6B is a top view of dispenser holder 13 and FIG. 6C is a bottom view of dispenser holder 13 revealing cantilevered extensions forming Y-shaped yokes for snap-in engagement with dispensing cartridges. The drawings show dispenser holder 13 includes a first Y-shaped yoke 25a having a first resilient extension 26 with a dispensing cartridge engaging lip 26a at the cantilevered end of extension 26 and a second resilient extension 28 having a dispensing cartridge engaging lip 28a at the cantilevered end of extension 28. In this example one or both of the extensions 26 and 28 are spreadable away from each other for snap-in engagement to a first top corner 14e and a second top corner 14f on triangular shaped dispensing cartridge 14.

Similarly, dispenser holder 13 includes a second Y-shaped yoke 25 having a third resilient extension 27 having a dispensing cartridge engaging lip 27a at the cantilevered end of extension 27 and a fourth resilient extension 29 having a dispensing cartridge engaging lip 29a at the cantilevered end of extension 29. In this example one or both of the extensions 27 and 29 are spreadable away from each other for snap-in engagement to a first top corner 15e and a second top corner 15f on triangular shaped dispensing cartridge 15.

Located on a bottom end of dispensing cartridge 14 is a finger rotatable wheel 34 that can be rotated to increase or decrease an open port area for water to enter a dispersant chamber 14d in dispensing cartridge 14 and located on the top end of cartridge 14 is an air vent 35 that allows air to escape from the dispersant chamber therein so that water can enter through the open port area in the bottom of dispensing cartridge 14. Similarly, located on the bottom end of dispensing cartridge 15 is a finger rotatable wheel 36 that can be hand rotated to increase or decrease an open port area for water to enter a dispersant chamber 15d in the dispensing cartridge 15 and located on the top end of cartridge 15 is an air vent 37 that allows air to escape from the dispersant chamber so that water can enter into the dispersant chamber in dispensing cartridge 15 through the open port area in the bottom of dispensing cartridge 15. Thus, a feature of the invention is that the dispensing rate from each of the dispensing cartridges 14 and 15 can be controlled independently of each other.

Figure 10:
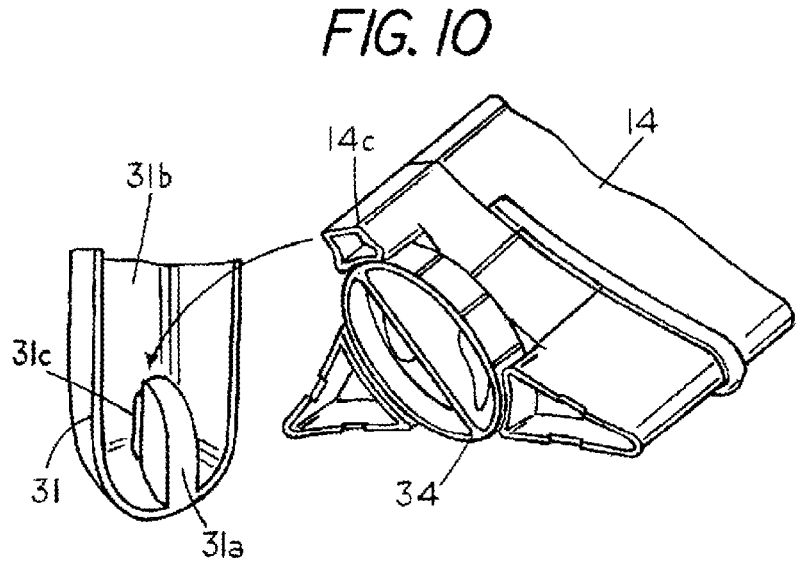
FIG. 10 is a perspective view illustrating formation of interlocking engagement between a post on the dispenser holder and a dispensing cartridge.

FIG. 5 shows dispenser holder 13 in top engagement with dispensing cartridge 14 through yolk extensions 26 and 28. In addition, FIG. 6 shows that dispenser holder 13 includes a U-shape rigid post 31 and a hook 31a for bottom end engagement to dispensing cartridge 14. FIG. 10 shows an arrow that indicates an insertion path the lower portion of dispensing cartridge 14 follows as tubular housing 14c thereon engages hook 31a to form a bottom locking engagement with post 31 as the top portion of dispensing cartridge 14 snaps into yolk extensions 26 and 28. Post 31 includes a stop 31c to engage and support housing 14c. A feature of the invention is that the interior concave surface 31b of U-shape rigid post 31 forms a guide surface or channel to assist alignment when inserting the tubular housing 14c onto the tubular extension 31a, thus facilitating a positive and quick alignment of the dispensing cartridge 14 with the dispenser holder 13 as well as forming support for a lower end of dispensing cartridge 14.

To attach dispensing cartridge 14 to dispenser holder 13 one first inserts the tubular housing 14 on dispensing cartridge 14 into engagement with hook 31a on cartridge 14. Next, one tilts or pivots the top of dispensing cartridge 14 forward until it snaps into engagement with the yolk formed by yolk extensions 26 and 28. Thus, in the example shown one obtains top securement of dispensing cartridge 14 to the dispenser holder 13 through coaction of the top yoke extension 26 and top yolk extension 28 and bottom securement of the dispensing cartridge 14 through engagement of the tubular housing 14c of dispensing cartridges 14 and hook 31a on post 31. Similarly, dispensing cartridge 15 and U-shaped rigid post 33, which contains an identical hook (FIG. 6B), can be brought into bottom locking engagement. Next, one tilts or pivots the top of dispensing cartridge 15 forward until it snaps into engagement with the yolk formed by yolk extensions 28 and 29 with the top locking engagement and bottom locking engagement allowing one to maintain a fixed relationship of the dispensing cartridge 15 with respect to the dispenser holder 13. This feature allows one to grasp the dispenser holder 13 and bring the dispenser holder into frictionally engagement with top cap 17b of filter cartridge 17 and top cap 18b of filter cartridge 18. The insertion of the dispensing cartridges 14 and 15 and dispenser holder 13 into engagement with the end cap 18b automatically positions the dispenser holder 13 and the dispensing cartridges 14 and 15 a spaced distance from the filter media as illustrated in FIG. 4A.

FIG. 6A is an isolated front view of dispenser holder 13 revealing a first U-shape rigid post 31 on one side of holder 13 and a second U-shape rigid post 33 on the opposite side of holder 13 with post 33 and post 31 cantilevered outward from below the base 13d of dispenser holder 13. Located in a central top portion of dispenser holder 13 is a first resilient bifurcated latch extension 40 and a second resilient bifurcated latch extension 42 for resiliently and simultaneously engaging a filter cartridge top cap 17b on filter 17 and a filter cartridge top cap 18b on filter 18 to hold the dispenser holder 13 and dispensing cartridges 14 and 15 in a dispensing position proximate the filter media 17a and the filter media 18a. A U-shaped finger grip 13a with an opening therethrough provides for finger engagement with dispenser holder 13 to allow a user to axially insert dispenser holder 13 and dispensing cartridges 14 and 15 thereon into locking engagement between filter cartridge 17 and filter cartridge 18 as well as to remove the dispenser holder 13 dispensing cartridges 14 and 15 when the dispensing cartridges are spent. In the example shown a dispensing cartridge 14 or 15 may be individually removed from the dispenser holder 13 while the dispenser holder remains attached to the filter caps since the dispensing cartridges can be latterly displaced away from the dispenser holder 13. In addition the dispensing cartridges 14 and 15 are each shown with a curved or concave face that follows the curved convex surface of the exterior of the filter cartridge to thereby provide a uniform flow distance between the filter media and the dispensing cartridge.

FIG. 6B is a top view of dispenser holder 13 without dispensing cartridges attached thereto. Extending from one side of holder 13 is a first U-shaped rigid post 31 that includes a hook 31a and stop 31c for engaging one end of a dispensing cartridge, which is located on one side of dispenser holder 13. Extending from the opposite side of holder 13 is a second identical U-shaped rigid post 33 that, similarly, includes a hook 33a and stop 33c for engaging with a one end of a second dispensing cartridge. The combination of the hook 31a and stop 31c with yoke lip 26a and yoke lip 28a form a three-point attachment to hold a first dispensing cartridge 15 on dispenser holder 13 as shown in FIG. 5. Similarly, the combination of the hook 33a and stop 33c with yoke lip 27a and yoke lip 29a also form a three-point attachment to hold a second dispensing cartridge 14 on dispenser holder 13 as shown in FIG. 5.

FIG. 6C is a bottom view of dispenser holder 13 without dispensing cartridges attached thereto. Extending outward from the underside of dispenser holder 13 are a first resilient bifurcated latching member 40 and a second bifurcated resilient latching member 42 that can engage the filter end cap 17b and 18b to support the dispenser holder 13 thereon.

FIG. 6 and FIG. 6B show that the frictionally mountable dispenser holder 13 includes a base 13d having a first dispensing cartridge top support comprising a first Y-shaped yoke 25 and a second dispensing cartridge top support comprising a second Y-shaped yoke 25a with a finger grip 13c extending outward from a topside of base 13d. A first cartridge post 33 extends from a bottom side of base 13d with the first cartridge post having a cartridge support 33a thereon as shown in FIG. 6B. Similarly, a second cartridge post 31 extends from a bottom side of base 13d with the second cartridge post having a cartridge support 31a thereon, which is also shown in FIG. 6B and FIG. 10.

Figure 13:
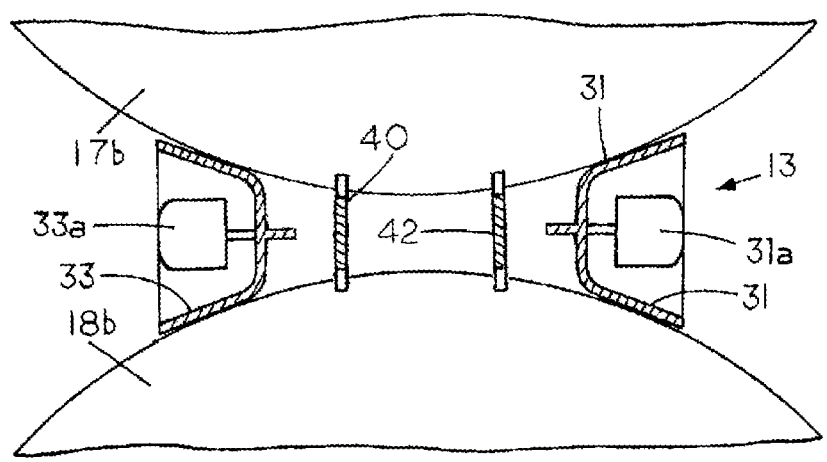
FIG. 13 is a top view illustrating a first step in flexing of a set of resilient latching fingers in relation to a filter end cap as the set of the resilient latching fingers are about to engage a filter end cap.
Figure 13A:
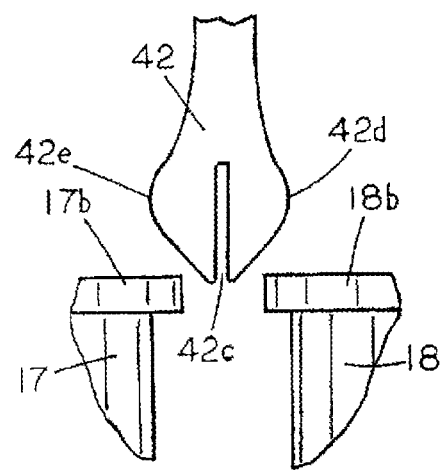
FIG. 13A is side view of one of the latching fingers of FIG. 13 showing the relationship of the one of the resilient latching finger to the filter end caps as the one of the resilient latching fingers is about to engage the side by side filter end caps.
Figure 14:
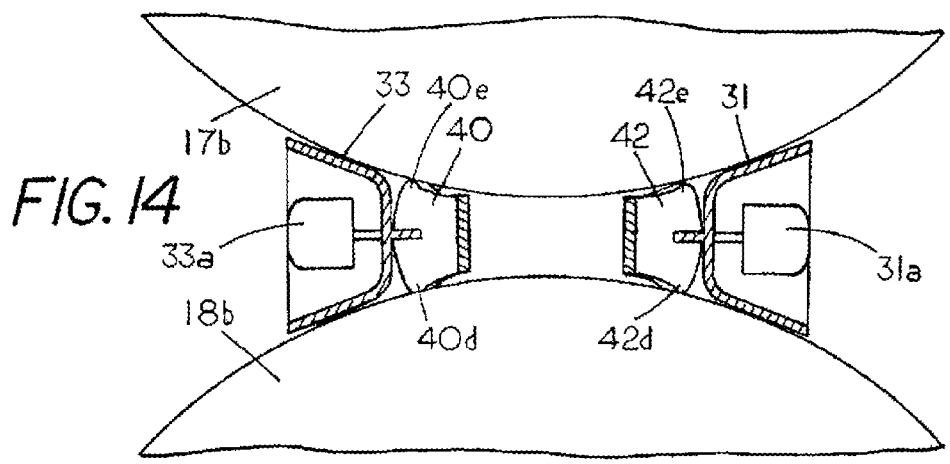
FIG. 14 is a top view showing the latching fingers of FIG. 13 in relation to a filter end cap as the latching fingers are sliding over lips of adjacent filter end caps.
Figure 15A:
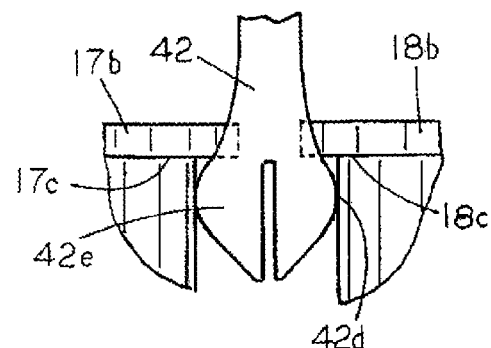
FIG. 15A is a side view showing one of the latching fingers of FIG. 13 in relation to the filter end caps after the latching finger has slid past the lip of adjacent filter end caps.
Figure 15:
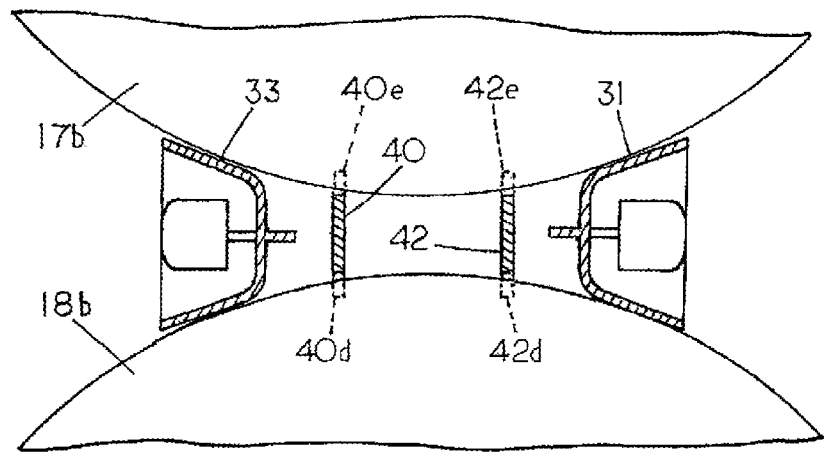
FIG. 15 is a top view showing one of the latching fingers in relation to the filter end caps after the latching fingers have slid past the lips of adjacent filter end caps.

FIG. 13a shows a detail of the resilient bifurcated latch 42 extending from the bottom side of base 13 that becomes a first filter cap engaging latch 42 through use of a first shoulder 42e on one side for engaging a first filter cartridge end cap on one of a set of side by side filter cartridges (i.e. 17) and a second shoulder 42d on an opposite side for engaging a second filter cartridge end cap on the other of the set of side by side filter cartridges (i.e. 18). As can be seen in FIG. 15A the shoulder 42e engages the underside 17c of lip 17b and the opposing shoulder 42d engages the underside 18c of lip 18b to frictional secure the dispenser holder 13 to filter cartridges 17 and 18. Similarly, as shown in FIG. 14 extending outward from the bottom side of base 13 is a second filter cap engaging latch 40 with a first shoulder 40d on one side for engaging a filter cartridge end cap on one of the set of side by side filter cartridges (17) and a second shoulder 40e for engaging a filter cartridge lip on the other of the set of side by side filter cartridges (18). Thus as illustrated in FIG. 15 latch 40 engages both filter end cap 17b and filter end cap 18b and latch 42 also engages both filter end cap 17b and filter end cap 18b to frictionally support the dispenser holder 13 proximate the filter cartridges 17.

Figure 7:
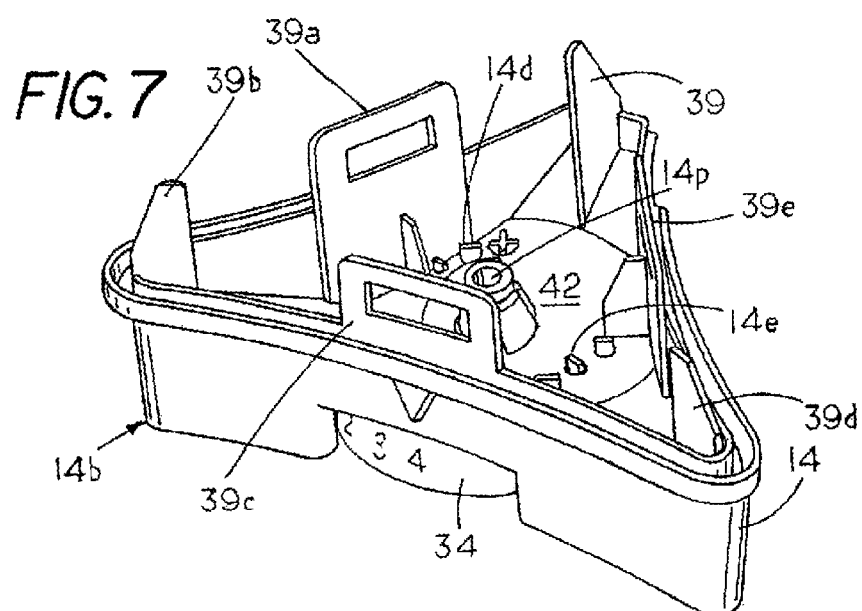
FIG. 7 is a perspective view an inside bottom end of one of the dispensing cartridges shown in FIG. 6.

FIG. 7 shows a rotateable port adjustment wheel 34, which is located at the bottom of dispensing cartridge 14 with a bottom cut away view showing a bottom end cap 14b that forms part of dispensing cartridge 14. In this example the rotatable wheel 34 rotates about pivot pin 14p to increase or decrease the water access area to the dispersant 24 (FIG. 4a) within compartment 14d of dispensing cartridge 14. The rotatable wheel 34 includes various size openings therein with the wheel rotatable to allow more or less water to enter the dispensing cartridge while retaining disperant within the dispensing cartridge 14. Similarly, a rotatable wheel 36 rotates about an identical pivot pin to increase or decrease the water access area to the dispersant 23 (FIG. 4a) within compartment 15d of dispensing cartridge 15.

Figure 9:
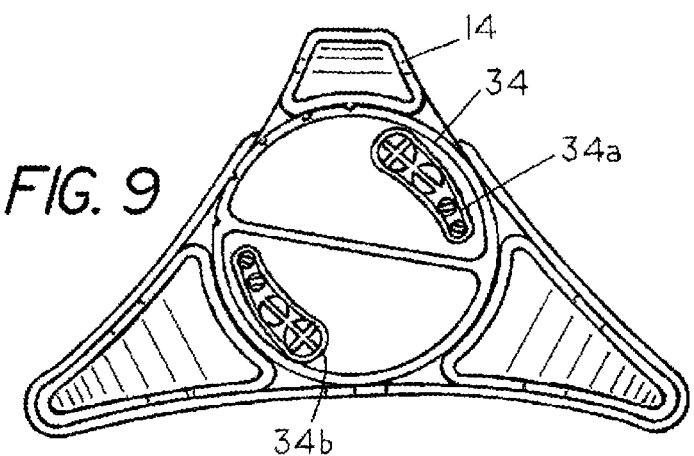
FIG. 9 is an outside bottom end view of one of the dispensing cartridges shown in FIG. 6.

FIG. 9 is a bottom view of dispensing cartridge 14 showing the tubular housing 14 and the elongated port 34b and elongated port 34e on rotatable wheel 34 that can be rotated to increase or decrease water access to disperant within dispensing cartridge 14.

In this example the lower portion of dispersant compartment 14 attaches to a triangular top housing as shown in FIG. 5 through locking extension 40, 40a, 40b, 40c, 40d and 40e to form compartment 42 for holding dispersant therein.

Figure 8:
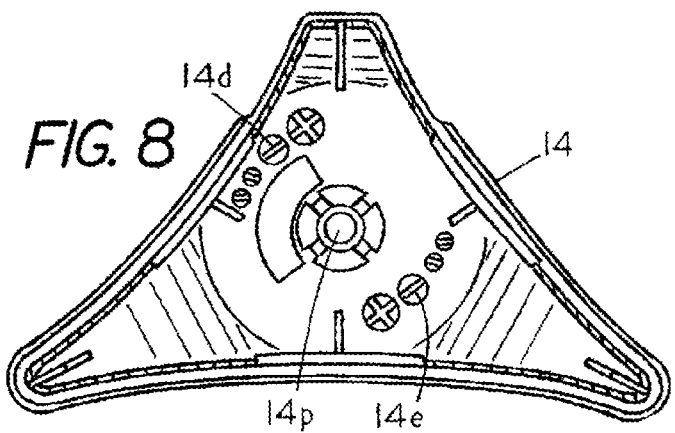
FIG. 8 is an inside bottom end view of one of the dispensing cartridges shown in FIG. 6.

FIG. 8 is a sectional inside view taken along line 8-8 of the dispensing cartridge 14 shown in FIG. 6 to reveal a first set of four circular ports 14d and a second set of four circular ports 14e that have an extension there across to limit large water treatment particles from passing therethrough. A pin 14p is rotationally supported in the bottom of dispensing cartridge 14 with the pin 14p attached to rotateable wheel 34 shown in FIG. 9. In the bottom view of dispensing cartridge shown in FIG. 9 the elongated water port 34a and elongated 34b are in alignment with a set of water ports 14d and 14e to permit water to access the dispersants 24 located in dispensing cartridge 14. Thus a feature of the invention is the rate of release of dispersants from the dispensing cartridge can be independently changed to accommodate different bacterial loads on the hot tub.

FIG. 11 is a side view of dispenser holder 13 with the first post 31 having a tapered longitudinal reinforcing rib 31c extending lengthwise therealong and the second post 33 having a tapered longitudinal reinforcing rib 33c extending therealong. Cantileverly extending from one side of base 13b of dispenser holder 13 is the first resilient, bifurcated cap latch 40 and cantileverly extending from the opposite side of base 12b is the second resilient, bifurcated cap latch 42. FIG. 11A shows an isolated perspective view of rib 31c in relation to a slot 42c in cap latch 42 prior to insertion of the dispenser holder 13 onto end cap 17a of filter cartridge 17 and end cap 18b of filter cartridge 18.

FIG. 12 illustrates how both resilient cap latch 40 and resilient cap latch 42 would bend or flex laterally outward during the process of inserting the dispenser holder 13 between adjacent filter cartridges 17 and 18. FIG. 12a illustrates that during the insertion process slot 40c of bifurcated cap latch 42 straddles rib 31c to provide clearance for a terminal end of cap latch 42 to flex outward past filter cartridge lips. Similarly, an identical slot bifurcated on cap latch 40 straddles rib 33c to provide clearance for a terminal end of cap latch 40 to flex outward past filter cartridge end cap 17a and filter cartridge end cap 18a during the insertion of the dispenser holder 13 onto an under water position adjacent filter end caps on adjacent filter cartridges 17 and 18.

FIG. 13 is a cross sectional top view of dispenser holder 13 taken along lines 13-13 of FIG. 12 revealing the lateral position of the resilient cap latches 40 and 42 prior to the engagement with filter end cap 17b and filter end cap 18b. FIG. 13A is an isolated view revealing the vertical unflexed position of resilient cap latch 42 and filter end cap 17b and 18b prior to the cap latch 42 coming into contact with filter end cap lip 17b and filter end cap lip 18b. In this condition the cap latch 42 remains in a normal non-flexed condition as shown in FIG. 11. FIG. 13A shows an isolated view of the cap latch 42 located vertically above the end cap 17b and end cap 18b in the normal non-flexed condition prior to engagement with the filter cartridge end caps 17b and 18b. Similarly, cap latch 40 is also located vertically above the end cap 17b and end cap 18b in the normal non-flexed condition prior to engagement with the filter cartridge end caps 17b and 18b as the dispenser holder 13 is lowered into filter end cap engagement.

Figure 14A:
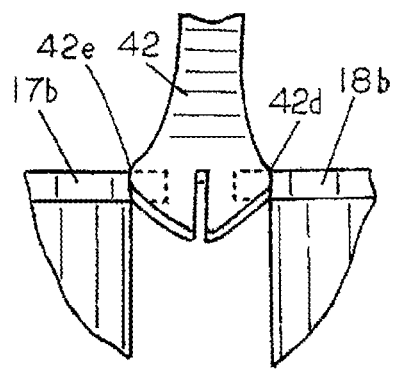
FIG. 14A is side view of one of the latching fingers of FIG. 14 showing the relationship of a resilient latching finger to the filter end caps as the resilient latching finger flexes to engage the lips of adjacent filter end caps.

FIG. 14 shows the lateral position of the cap latch 40 and cap latch 42 during the process of simultaneously inserting the dispenser holder 13 into engagement with the filter end cap 17b and filter end cap 18b. In the position shown the cap latch 40 and the cap latch 42 have both been flexed laterally outward in order for the terminal end of cap latches 40 and 42 to pass over the end cap 17b and end cap 18b. FIG. 14a shows cap latch 42 in a flexed condition as the cap latch 42 contacts filter end cap 17b and filter end cap 18b. Similarly, cap latch 40 contacts filter end cap 17b causing cap latch 40 to flex latterly outward so the terminal end of cap latch 40 can pass over the end cap 17b and end cap 18b for engagement with the underside 17c of the end cap 17 and the underside 18c of end cap 18.

FIG. 15 illustrates the final step of the process of insertion the dispenser holder 13 on to adjacent filter cartridges 17 and 18. In this step, resilient cap latches 42 and 40 flex back to their original orientation shown in FIG. 11 and FIG. 13. That is, once the terminal end of cap latch 42 and the terminal end of cap latch 40 are forced past the end caps 17b and 18b the resiliency of the cap latches urges the cap latch 42 and cap latch 40 to return to the original orientation. As cap latch 42 returns toward a normal or original orientation a shoulder 42d on one side of cap latch 42 engages the underside 18c of filter end cap 18b and a shoulder 42e on the opposite of cap last 42 engages the under side 17c of filter end cap 17b to thereby restrain dispenser holder 13 from upward movement. Similarly, as cap latch 40 returns toward a normal or original orientation a shoulder 40e on one side of cap latch 40 engages the underside 18c of filter end cap 18b and a shoulder 40d on the opposite side of cap latch 40 engages the under side 17c of filter end cap 17b to thereby restrain dispenser holder 13 from upward movement.

Since the cap latches 40 and 42 are both resilient an upward force on dispenser holder 13 permits one to overcome the restraining engagement of cap latch 40 and 42 by pulling upward on dispenser holder 13 if one wants to remove the dispenser holder. Thus, a feature of the invention is that one can insert the dispenser holder 13 with dispensing cartridges 14 and 15 thereon from a position above filter cartridges (shown in FIG. 2) into a disperant delivery position (shown in FIG. 3) by lowering the dispenser holder 13 until both the cap latches 42 and 40 engage the filter cap lips 17b and 18b. Once the cap latches 40 and 42 engage the filter cap lips 17b and 18b the cartridges 14 and 15 on dispenser holder 13 remain in an operative dispensing condition until the dispenser holder 13 is removed by pulling upward on dispenser holder 13 sufficiently to overpower the resistance provided by engagement of cap latches 40 and 42 with filter end caps 17b and 18b.

Thus, in the example of FIG. 1 the hot tub 10 contains a water chamber 14 and a body of recirculating water 9 with the hot tub including a filter well 11 having at least one cylindrical filter cartridge 17, which is located below a water line 19 in the hot tub, with the cylindrical filter cartridge 12 having a filter media 17a for removing debris and bacteria from the recirculating water 9 as the recirculating water flows through the filter media. The dispenser holder 13, which is located in filter well 11, is supported on an end cap 17b of filter cartridge 17 and on end cap 18b of adjacent filter cartridge 18. While the dispenser holder 13 is supported on the end cap of adjacent filter cartridges the dispenser holder could be supported on the end cap of a single filter cartridge. In this condition the hot tub system provides filtering without reduction of the filtering area and without modification of the hardware of the hot tub since the dispenser holder and the cartridge dispensers are both spaced from but proximate an exterior surface of the filter media to form a gap therebetween with the gap sufficient large so as to allow the recirculating water to flow into the gap and through the filter media proximate the dispenser holder. At least one or more dispensing cartridges, such as cartridges 14 and 15 are removably attached to the dispenser holder 13 with each of the dispensing cartridges containing a dispersant therein with the outlet (FIG. 9) of the dispensing cartridge located below the water line 17 and spaced from the filter media to thereby deliver the dispersants therein into the recirculating water flowing through the filter media in the filter cartridges 17 and 18 without disrupting the performance of the hot tub recirculation system and without having a dispenser in the filter well that will from time to time interfere with the flow of recirculating water therethrough.

The underwater dispenser holder and the dispensing cartridges described and shown herein may include some or all of the following features including; a rigid base having a first filter engaging lip and a second filter engaging lip; a filter latch extending outward from said base; a first dispenser engaging base post including a pocket for inserting a dispenser lip therein; a dispenser latch; a resilient filter latch; a base post includes a ramp for guiding a dispenser into latching engagement therewith; a base having a lip having an arcuate shape engageable with a portion of a top edge of a filter cartridge; a filter latch comprising a set of cartridge engaging legs; a bottom end of either the first dispenser or the second dispenser including a set of internal extensions proximate a variable water inlet to inhibit particles from blocking the water inlet; a Y-shaped yoke having a pair of resilient lateral extensions for snappable engagement with a one end of a dispensing cartridge, a replaceable cartridge having a finger relief to assist in snapping the replaceable cartridge into or out of a dispenser holder; a dispensing cartridge with a set of elongated sidewalls with at least two of the set of elongated sidewalls having a concave arcuate surface; a bottom end of a dispensing cartridge including a rotatable disk for increasing or decreasing size of a water inlet on the bottom end of the cartridge; a hook thereon for engagement with a pocket on a dispensing cartridge; a dispensing cartridge having a first corner lip and a second corner lip for engagement to a top end of a filter well dispenser holder for securing a dispensing cartridge to the filter well dispenser holder; a dispensing cartridge and a dispenser holder comprising a plastic polymer; a dispensing cartridge attached to the filter cartridge with the dispensing cartridge located below the water line and spaced from the filter cartridge so as not to prevent circulation of hot tub water through the filter cartridge; a further dispensing cartridge attached to the filter cartridge with the further dispensing cartridge located below the water line and spaced from the filter cartridge so as not to prevent circulation of hot tub water through the filter cartridge; a dispensing cartridge and a further dispensing cartridge supported therein by a dispenser holder securable to and removal from an end cap of the filter cartridge and an end cap of a further filter cartridge with the filter cartridge and the further filter cartilage located in a spaced vertical condition proximate each other; a dispenser holder including a first set of resilient fingers engageable with a filter cartridge and a further filter cartridge and a second set of resilient fingers engageable with a filter cartridge and a further filter cartridge; a dispenser and dispenser holder contouring with the filter cartridge and a filter well to avoid interference with movement of a weir door in the filter well; a dispensing cartridge and a dispenser holder that do not extend vertically above a top end cap on a filter cartridge or a top end cap on a further filter cartridge; a dispenser holder including a first lip engageable with a top end cap of a first filter cartridge and a second lip engageable with a top end cap on a second filter cartridge to vertically support the dispenser holder thereon; and an axial length of the dispenser holder longer than an axial length of a dispensing cartridge thereon with the axial length of the dispensing cartridge less than an axial length of a filter cartridge.

The invention may include some or all of the steps of killing harmful organisms in a hot tub while removing debri from recirculating water including the steps of; attaching a dispenser containing a dispersant to the filter cartridge with the dispenser spaced from the filter cartridge so as not to prevent a flow of recirculating water therethrough; and axially inserting a dispenser holder carrying a first replaceable cartridge and a second replaceable cartridge in a space between a set of vertically extending filter cartridges.

Referring to FIGS. 16 and 17, FIG. 16 shows an isolated front view of a filter well 50 of a hot tub with a filter well underwater dispenser holder 51 located proximate a filter media 53 of a horizontal extending filter cartridge 52. FIG. 17 is an isolated perspective view of the dispenser holder 51 of FIG. 16 and FIG. 16A is a sectional view taken along lines 16A-16A of FIG. 16 showing a dispenser holder back face 51a against the filter well back wall 50a. Dispenser holder 51 includes a first radial offset arm 60 engaged with a pipe 62 on one end of the filter cartridge 52 and, similarly, as shown in FIG. 16 a second radial offset arm 59 engaged with pipe 61 on an opposite end of cartridge 52 to support dispenser holder 51 thereon. In this example the dispenser holder back face 51a engagement with filter well wall 50a prevents rotation of the dispenser holder 50 while end pipe 62 and end pipe 61 (FIG. 18, FIG. 19) prevent lateral or downward displacement of dispenser holder 50. FIG. 16A and FIG. 17 also show that dispenser holder 51 cantileverly supports the dispensing cartridge sockets 65 and 66 outward over the filter cartridge media 52 with the sockets spaced from the filter media a distance x so that water can flow between the bottom of the dispensing cartridges and through the filter cartridge media 53 proximate the filter cartridge sockets 65 and 66.

Filter cartridge 52 includes a first filter end cap 54 located at a first end 53a and a second filter end cap 55 located at a second end 53b of filter media 53. It is noted that the terms horizontal extending, as used to describe filter cartridge 52, may be defined as filter cartridge 52 supported within filter well 50 with a length of filter cartridge 52 extending from a first filter end cap 54 to a second filter end cap 55 with a central axis of the filter cartridge parallel or substantially parallel to a water line 56 in filter well 50.

As shown in FIG. 16 and FIG. 16A, when in use dispenser holder 51 is located below the water line 56 in filter well 50 with the dispenser holder 51 supported proximal the ends of filter cartridge 52. Dispenser holder 51 is located proximate an exterior surface of the filter media 53 but spaced from the exterior surface of the filter media 53 at least a distance denoted by x which is sufficiently large so as to allow the recirculating water to flow through the filter media 53 proximate the dispenser holder 51 and dispensing cartridges 57 and 58.

Dispenser holder 51 may support one or more dispensing cartridges with each of the dispensing cartridges containing a dispersant therein, the embodiment of FIGS. 16 and 17 show dispenser holder 51 supporting a first dispensing cartridge 57 and a second dispensing cartridge 58 with each of the dispensing cartridges 57, 58 being removably attached to dispenser holder 51 and each containing a dispersant therein.

In regards to the dispersant, it is noted that the dispersant supported by first dispensing cartridge 57 may contain a sanitizing halogen such as chlorine and the dispersant supported by second dispensing cartridge 58 may contains a mineral. Examples of sanitizing halogens include but is not limited to chlorine, bromine, bromo-3-chloro-5,5-dimethyihydantoin (BCDMH), 1,3-dichloro-5,5-dimethylhydantoin; (Dantachlor), dichloromethylethylhydantoin (DCDMH), and dichloromethylethylhydantoin (DCMEH) and a mixture of at least two of the aforementioned such as a mixture of DCDMH and DCMEH. Examples of the minerals include any ion yielding materials that can be used to treat water in hot tubs or spas to rid the hot tubs or spas water of unwanted organisms. One particularly well-suited dispersant mineral uses silver chloride as an ion yielding material.

FIG. 16 shows dispensing cartridges 57, 58 cantileverly supported on a topside of dispenser holder 51 but below the water line 56 with an outlet of each of the dispensing cartridges 57, 58 spaced from the filter media 53 to thereby deliver the dispersant therein into the recirculating water flowing through the filter media 53. In some cases the filter cartridge may be above the waterline as long as the dispersing orifices of the dispensing cartridges are located below the water line.

Although dispenser holder 51 may support the dispensing cartridges 57, 58 in a variety of ways, in the embodiment of FIGS. 16 and 17, dispenser holder 51 is shown including a split socket 65 for replaceably mounting dispensing cartridge 57 to dispenser holder 51 and a split socket 66 for replaceably mounting dispensing cartridge 58 to dispenser holder 51.

In the embodiment of FIGS. 16 and 17, filter well dispenser holder 51 comprises a rigid longitudinal base 51a including a first radial offset arm 59 located at one end of base 51a and a second radial offset arm 60 located at the opposite end of base 51a with offset radial arm 59 having a hub 59a for radial insertion onto an end member 61 proximate a first end cap 54 of filter cartridge 57, and a second offset radial arm 60 having a hub 60a that extends more than 180 degrees to form snap-in engagement with an end member 62 proximate a second end cap 55 of filter cartridge 57, similarly radial arm hub 59a may form snap-in engagement.

FIG. 18 is a partial perspective view showing one end of filter well dispenser holder 51 of FIG. 17 with hub 59a, which is located on a terminal end of offset radial arm 59. In this example hub 59a is in engagement with a circular filter cartridge end pipe 61 that extends outward from a first end of filter cartridge 52. The hub 59a of radially offset arm 59 may be secured to the annular end pipe 61 of filter cartridge 52 through relative dimensional sizing of the annular end pipe 61 and the hub 59a to thereby maintain the dispenser holder 60 proximate the filter cartridge 52, for example an interference entry fit between hub 59a and end pipe 61 that causes the hub 59a to secure itself to end pipe 61 in a snap-in engagement. A reference to FIG. 20 illustrates the snap-in feature with respect to a hub reducer 63. Hub reducer 63 has a diametrical inside dimension D and a hub entry dimension $D_1$, that extends between end 63c and end 63d of hub 63. In this example the diametrical dimension D, is smaller than $D_1$ as a result of hub 63 extending beyond 180 degrees. The extension of hub 63 beyond 180 degrees creates a return lip 63c and a return lip 63d on the ends of hub 63 with a smaller opening $D_1$ therebetween than the larger diameter D of the filter cartridge pipe 61. Consequently, hub 63, which is resilient, must yield or spread apart to allow lateral insertion of pipe 61 of diameter D between end 63c and 63d and into the hub 63. Once pipe 61 is centrally located in hub 63 the hub 63 returns to the original condition thus locking the hub 63 around the pipe 61 with ends 63c and 63d. Thus, a feature of the invention is having one or more hubs that extend beyond 180 degrees with the hub resiliently yielding for laterally insertion of a circular filter cartridge end pipe therein. Once an end pipe is within the hub the resiliency of the hub automatically returns the hub to its original size, i.e. a snap-in engagement. Although a snap-in feature is shown other methods may be used to secure the offset radial arms 59 and 60 of dispenser holder 51 to the end pipes on the filter cartridge 52 without departing from the spirit and scope of the invention.

FIG. 19 is a partial perspective view showing the second end of filter well dispenser holder 51 with a hub 60a, which is located on a terminal end of offset radial arm 60. In this example hub 60a is located in a snap-in engagement with end pipe 62 of filter cartridge 52.

Typically, the diameter of hub 59a and hub 60a on dispenser holder 60 are the same since most filter cartridges have the same diameter end pipe on both ends of the filter cartridge. However, in some filter cartridges the diameter of the end pipe on one end of the filter cartridge may be smaller than the diameter of the end pipe on the other end of the filter cartridge thus preventing attachment of dispenser holder 51 thereto. A feature of dispenser holder 51 is that the inside diameter of one or both of hub 59a and hub 60a can reduced by attaching the reducer 63 having an internal diameter D to either or both of the offset radial arms 59 and 60.

FIG. 20 is a perspective view of the reducer or end adapter 63 with a hub inlet diameter $D_1$ that is less than the hub internal diameter D. In this example end adapter 63 has resilient cantilevered extension 63a with an end of each of the resilient cantilevered extensions including a hook or head 63b for retention of the end adapter 63 on either offset radial arm 59 or offset radial arm 60. FIG. 17 shows that radial arm 59 contains a set of elongated hub slots 64 proximate the hub 59a for receiving the resilient extensions 63a of reducer 63 to thereby form a smaller diameter hub for engagement with a smaller diameter pipe 62 on a filter cartridge. Similarly, radial arm 60 includes an identical set of hub slots (not shown). In this example, hub slots are located on both offset radial arms 59 and 60 so that the end adapter 63, which contains a smaller diameter hub therein, may be mounted to either one of the radial arms 59 or 60 to reduce the diameter of the hub at the end of the radial arm so that the hub on the radial arm can be fitted to the end pipe on the filter cartridge 52, preferably through a snap-in engagement.

FIG. 19 shows an example of on-the-go compensation for a smaller diameter pipe 62 on a filter cartridge. In this example the lateral extensions 63a on end adapter 63 have been inserted into slots located on radial arm proximate hub 60a thereby creating a reduced diameter hub that can be brought into supported engagement with pipe 62 of filter cartridge 52. In summary, the use of end adapter 63, which is removably attachable to either of the off set radial arms 59 or 60 allows one to on-the-go change the hub size on one or both of the radial arms of dispenser holder 51 through snap-in securement. For example, end adapter 63 includes at least one locking protrusion 63a engageable with at least one corresponding adapter-receiving slot located on each of the arms 59 or 60 of the dispenser holder 51 to thereby secure the end adapter 63 to the radial offset arm.

FIG. 20A is front view showing another example of an end adapter 78 that can be locked to the radial offset arm 60 through partial rotation of end adapter 78. In this example the central diameter D engages the end pipe 62 and the hub entry dimension $D_1$ of the end adapter can be the same, slightly larger or slightly smaller than end pipe 62 as the adapter 78 can be mechanically secured to end pipe 62 through partial rotation of end adapter 78 about pipe 62. That is, one uses front finger grips 79 and 79a, to rotate end adapter 78 to reduce the hub entry dimension $D_1$ thereby preventing the end adapter 78 from being removed from end pipe 62.

Extending radially outward from one side of end adapter 78 is a first latch 78a and extending radially outward from an opposite side of end adapter 78 is a second latch 78b, which is identical to latch 78a. Latch 78a, projects both radially and laterally outward from a front face of adapter 78 and includes a first beveled surface 78e and a second beveled surface 78c that joins to opposite edges of a flat top base 78d.

FIG. 20B is a side view of the end adapter of FIG. 20a showing latch 78a includes a lateral leg 78f that extends perpendicular from the backside of adapter 78 to enable mating of the end adapter latch 78a with a similar latch 80a on the offset radial arm 60. Similarly, latch 78b includes a lateral leg (not shown) that extends perpendicular from the backside of adapter 78 to enable mating of latch 78b with a latch 81a on the offset radial arm 60. In this example each of the latches have a flat top base and beveled edges that adjoin the flat top base.

FIG. 20C is a partial view of offset radial arm 60 having mating latches for engaging with the end adapter of FIG. 20A with the latches comprising a first mating latch 80a having a first beveled surface 80c and a second beveled surface 80e that join to opposite edges of a top base 80d located proximate an L-shaped opening 80f that extends through arm 60. Arm 60 includes a second mating latch 81a having a first beveled surface 81b and a second beveled surface 81c that join to opposite edges of a flat top base 81d with second latch 81a located proximate an L-shaped opening 81f that extends through arm 60.

In this example latch 78a and latch 78b are asymmetrical positioned on end adapter 78 and the mating latches 80a and 81a on arm 60 are also asymmetrically positioned so that the latches 78a and 78b on end adapter 78 can be inserted into proper position on only one face of radial arm 60. During the insertion process latch 78b is extended through the L shaped opening 81f and latch 78a is extended thought the L-shaped opening 80d to bring the end adapter 78 into face-to-face engagement with the radial arm 60. Once latches 78a and 78b have been inserted into the L-shaped openings in radial arm 60 a partial rotation of end adapter 78 brings latch 78a into engagement with latch 80b and latch 78b into engagement with latch 81a. In this example as end adapter 78 is rotated counter clockwise the beveled surface 78e on latch 78a engages a beveled surface 80e on latch 80b. As rotation is continued the flat top 78d of latch 78a slides up beveled surface 80e and over flat surface 80e until the beveled surface 78c of latch 78 and beveled surface 80c of latch 80a are in face-to-face contact thereby providing resistance to counter rotation. Similarly, the beveled surfaces of latch 78b and latch 81a engage each other hold end adapter 78 in the rotated position on radial arm 60. To release the end adapter from the hub 62 the end adapter 78 is rotated in the clockwise direction thereby reducing the circumferential engagement around pipe 62 sufficiently to thus allowing 60 and end adapter 78 to be lifted off pipe 62.

Figure 23:
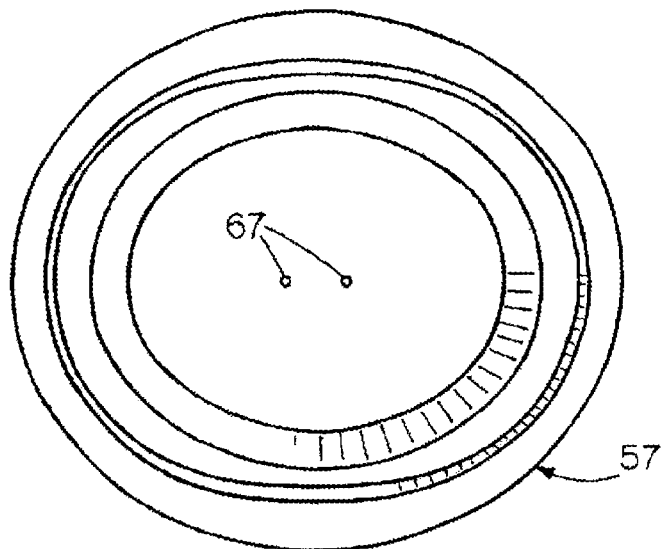
FIG. 23 is a top view of a dispensing cartridge of FIG. 21.
Figure 24:
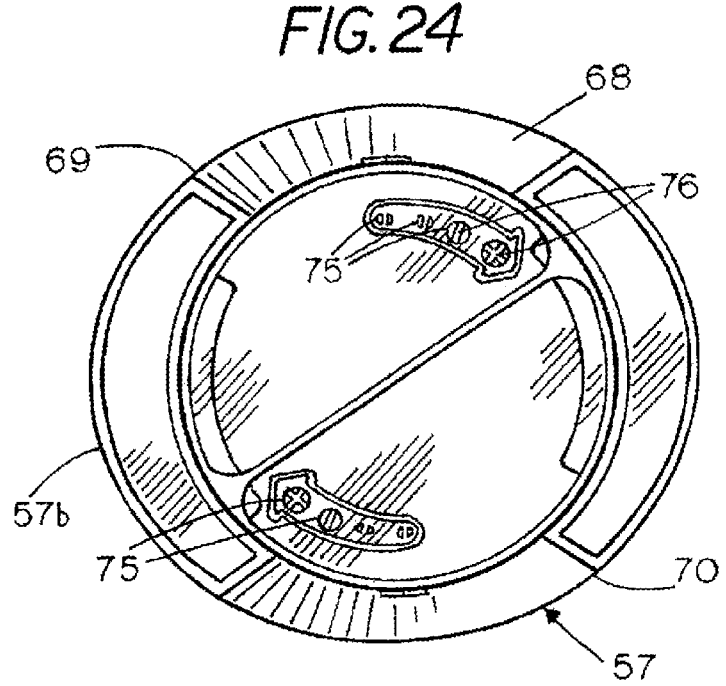
FIG. 24 is a bottom view of a dispensing cartridge of FIG. 21.

FIG. 21 shows the front face of dispensing cartridge 57 and FIG. 22 shows the side face of dispensing cartridge 57. FIG. 23 is a top view of dispensing cartridge 58, and FIG. 24 is a bottom view of dispensing cartridge 57 that is mountable to the filter well dispenser holder 51 of FIG. 17. Dispensing cartridge 57 generally comprises an oval-shaped body with an elliptical shaped base 57a having a flat bottom 57b for twist-in installation of the dispensing cartridge into a socket in the dispenser holder 51. FIG. 21 shows base 57a having a side-to-side width W (i.e. a major axis) and FIG. 22 shows the base 57a having a front-to-back width $W_1$ (i.e. a minor axis) with $W_1$ less than W. In this example base 57a includes an inward canted face 57c for facilitating engagement with a socket on the dispenser holder 51. In other embodiments the diameter of hubs 59a and 60a or adapter 62 may be sized to be slightly larger than, slightly smaller than, or similar to the matching hub diameter.

Dispensing cartridge 57 includes at least one vent hole and preferably a plurality of vent holes 67 located on a top end 57a of dispensing cartridge 57, the vent holes 67 enabling air to escape from the dispensing cartridge to allow water to come into contact with a dispersant therein through ports located on the bottom of dispensing cartridge 57.

FIG. 21 shows dispensing cartridge 57 includes a rotatably adjustable dispensing dial 68 located proximal base 57b of the dispensing cartridge 57 for controlling the ingress and egress of dispersant through from the dispensing cartridge 57. The dispensing cartridge of the present invention also includes the feature of at least one dispensing cartridge window 69 providing user viewing access to the rotatable dial 68. In the embodiment of FIGS. 21 and 24, dispensing cartridge 57 is shown as having pair of diametrically opposing windows 69, 70 located proximal the bottom end 57b of dispensing cartridge 57 providing user access to the rotatable dial 68.

Figure 25:
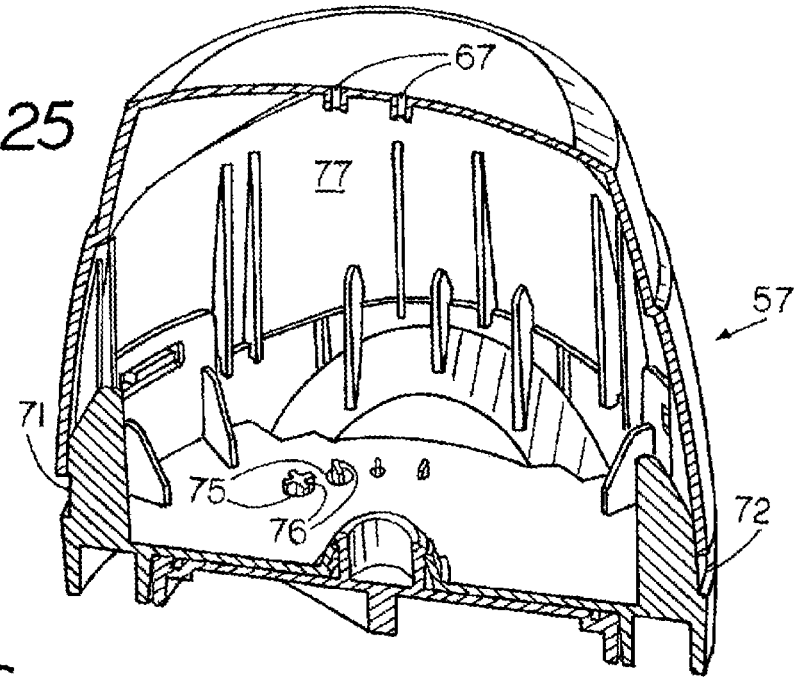
FIG. 25 is a sectional view of a dispensing cartridge of FIG. 21.

Another feature of dispensing cartridge 57 is that at least one circumferential latch pocket is located on an exterior surface of the dispensing cartridge with the pocket mateable with a radial protrusion located within a dispensing cartridge socket to rotationally and laterally secure the dispensing cartridge to the cartridge socket. FIG. 21 and FIG. 25 show a first circumferential latch pocket 71 located on one side of dispensing cartridge 57 and a second circumferential latch pocket 72 located on the opposite side of dispensing cartridge 57 while FIG. 22 shows a front view of latch pocket 71 having a first bevel sidewall 75 on one end of pocket 71 and a second beveled sidewall on the opposite end of latch pocket 71. Similarly, latch pocket 72 includes a first bevel sidewall on one end of latch pocket 72 and a second beveled sidewall on the opposite end of latch pocket 72. A feature of the invention is the beveled sidewalls 75 and 76 in latch pocket 71 provide limited resistance to twist removal of dispensing cartridge 57 from the dispensing cartridge supporting socket 65 since the protrusions 73 and 74 (FIG. 26A) in the socket 65 can slide up the beveled sidewalls as a torque is applied to the dispensing cartridge.

FIG. 25 is a sectional view of a dispensing cartridge 57 of FIG. 21 mountable in the dispenser holder of FIG. 17. Referring to the outlet of the dispensing cartridge 57, FIGS. 24 and 25 show the outlet of dispensing cartridge 57 as comprising two sets of adjustable output holes 75 of varying sizes for the dispensing of dispersant therethrough. The dispensing from output holes 75 is controlled by rotatably adjustable dispensing dial 68. The size adjustable output holes 75 also includes stand-offs 75 extending partially into an interior 77 of the dispensing cartridge 57 to prevent material blockage of the output holes 75 with the stand-off 75 each having shapes and sizes that correspond to the specific sizes of the particular adjustable output holes 75.

Figure 26:
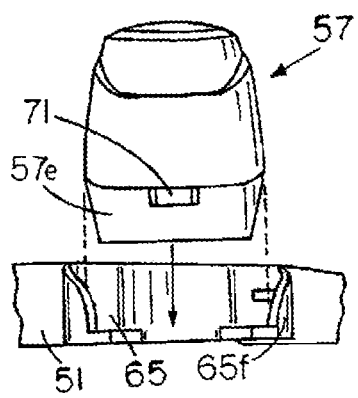
FIG. 26 is a front view of a dispensing cartridge of FIG. 21 about to be axially inserted into a cartridge socket in the dispenser holder of FIG. 17.
Figures 26A, 27A, 28A:
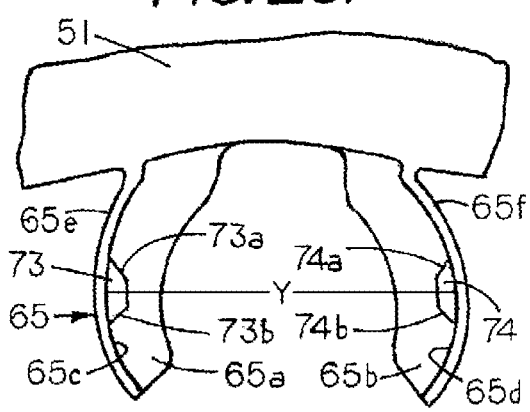
FIG. 26A is a top view of the cartridge socket of FIG. 26.
FIG. 27A shows an isolated top sectional view of one of the resilient extensions of the cartridge socket and a dispensing cartridge.
FIG. 28A is an isolated top sectional view of the latching engagement of one side of the cartridge socket and one side of the dispensing cartridge of FIG. 21.

FIG. 26 is a side view showing dispensing cartridge 57 about to be axially inserted into split socket 65 and FIG. 26A is a top view of a split socket 65 that cantileverly extends from dispensing holder 51. Socket 65 comprises a first resilient arcuate extension 65e cantileverly extending from dispenser holder 51 with the extension 65e having a flat base 65a and an arcuate lip 65c to support and engage one side of a dispensing cartridge. Similarly, a second resilient arcuate extension 65f cantileverly extends from dispensing holder 51 with the second arcuate extension 65f also having a flat base 65b and an arcuate lip 65d to support and engage an opposite side of the dispensing cartridge with the extensions 65e and 65f coacting to support a dispensing cartridge therebetween. Located on arcuate extension 65e is a radial protrusion 73 having a first beveled end 73a and a second beveled end 73b for rotationally engaging one side of a dispensing cartridge. Similarly, located on arcuate extension 65f is a radial protrusion 74 having a first beveled end 74a and a second beveled end 74b for rotationally engaging an opposite side of the dispensing cartridge located therein.

Figure 27:
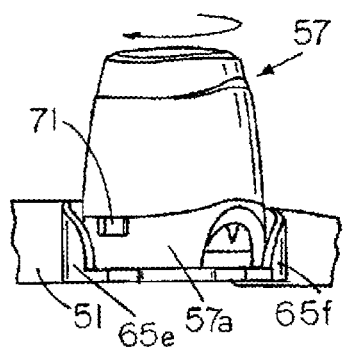
FIG. 27 is a top view of the dispensing cartridge of FIG. 21 in engagement with a socket in the dispenser holder of FIG. 17.
Figure 28:
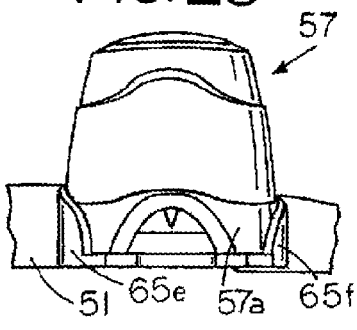
FIG. 28 shows dispenser carriage of FIG. 21 rotated into locking engagement with the dispenser holder of FIG. 17.

FIG. 27 shows dispensing cartridge 57 of FIG. 21 as it is rotated into locking engagement with the dispenser holder 51 of FIG. 17. FIG. 28 shows dispensing cartridge 57 of FIG. 21 rotated into locking engagement with the dispenser holder 51 of FIG. 17. A further feature of the dispenser holder is that the may be axially inserted by aligning the radial protusion and the forcing the cartridge axially into the dispenser holder.

FIGS. 26, FIG. 27 and FIG. 28 show successive steps in attaching a dispensing cartridge 57 to a split socket on dispenser holder 51, which comprises aligning the dispensing cartridge 57 with a split socket 65 as shown in FIG. 26 and rotating the dispensing cartridge into latching engagement with the socket as shown in FIGS. 27 and 28. More specifically, in the first step shown in FIG. 26 the dispensing cartridge 57 is positioned above socket 65 with the side face of cartridge 57 having latch pocket 71 thereon facing outward. Note, in this positioned the cartridge width $W_1$ (FIG. 21) is less than a relaxed width y of the side-to-side opening in socket 25, which allows one to quickly align and insert the cartridge 57 into the socket 65 until the cartridge base 57a contacts socket flat base 65a and socket flat base 65b. Once the cartridge 57 contacts the flat base 65a and flat base 65b one rotates the cartridge 57 as shown by the arrow in in FIG. 27.

FIG. 27A is a partial isolated top view showing the circumferential position of radial protrusion 73 with respect to latch pocket 71 during the second step. In this step the resilient extension 65e and 65f flex outward to allow rotation of cartridge 57. A continued rotation of cartridge 57, which is shown in FIG. 28, brings the radial protrusion 73 into engagement with latch 71 pocket through the resiliency of extension 65e and extension 65f. Similarly, radial protrusion 74 is brought into engagement with the latch pocket 72, which also provides a resistance for further rotation as well as securing the dispensing cartridge 57 in operative dispensing position in socket 65.

Thus the steps of securing a dispensing cartridge 57 to the dispenser holder 51 include axially inserting dispensing cartridge 57 into socket 65 of the dispenser holder 51 until the dispensing cartridge 57 engages dispensing cartridge socket 65. Dispensing cartridge 57 is then rotated into locking engagement, which may be identified by the engagement of latch pocket 71 of filter cartridge 57 with a corresponding radial protrusion 73 and latch pocket 72 in engagement with radial protrusion 74.

Although not shown, when dispensing cartridge 57 needs to be replaced, dispensing cartridge 57 may be removed from the socket 65 by reversing the process, i.e. twisting dispensing cartridge 57 to disengage latch pocket 71 and latch pocket 72 with the protrusions 73 and 74 in socket 65 and then axially lifting the dispensing cartridge 57 out of the socket 65. Thus, a feature of the invention is the easy attachment and easy removal of a dispensing cartridge even though the dispensing cartridge is securely held in the socket 65.

The present invention also includes a method of sanitizing a body of recirculating water comprising the steps (1) removing a top lid of a hot tub filter well 50 having a filter cartridge 52 located below a water line 56 in a horizontal condition with the filter cartridge 52 having a filter media 53 therein for removing debris and bacteria from a recirculating water as the recirculating water flows through the filter media 53, (2) mounting a dispenser holder 51 within the filter well 50 with the dispenser holder 51 supported proximal a first end and a second end of the filter cartridge 52 and located proximate an exterior surface of the filter media 53 but spaced from the exterior surface of the filter media 53 so as to allow the recirculating water to flow through the filter media 53 proximate the dispenser holder 51, (3) axially inserting at least one dispensing cartridge 57, 58 containing a dispersant into a dispensing cartridge supporting socket

65, 66 of the dispenser holder 51, (4) rotating the dispensing cartridge 57, 58 supported by the dispensing cartridge supporting socket 65, 66 towards locking engagement, (5) engaging at least one latch pocket 71, 72 of the filter cartridge 52 with a corresponding protrusion 73, 74 of the dispensing cartridge supporting socket 65 to lock the dispensing cartridge 57 to the dispensing cartridge supporting socket 65 and (6) covering the hot tub filter well 50 with the top lid.

The above method may also include the steps of (7) controlling the dispensing of the dispersant in the dispensing cartridge 57 and 58 in the presence of recirculating water by adjusting the size of an adjustable outlet of the dispensing cartridge 57 and 58 located on the dispensing cartridge and (8) mounting the dispenser holder 51 to a filter cartridge mounting port 61 located proximal each of the ends of the filter cartridge 52 in a snap-in manner, and (9) removing the dispensing cartridge 57 and 58 from the respective dispenser supporting socket 65 and 66 by twisting the dispensing cartridge 57 and 58 to disengage the latch pocket 71 and 72 of the dispensing cartridges 57 and 58 with the corresponding protrusion 73 and 74 of and then axially removing the dispensing cartridges 57 and 58 from the dispenser supporting socket 65 and 66.

Thus as shown and described herein, a feature of the invention is a hot tub having a water chamber containing a body of recirculating water with the hot tub including a filter well having a filter cartridge located below a water line in a horizontal condition with the filter cartridge having a filter media therein for removing debris and bacteria from the recirculating water as the recirculating water flows through the filter media; a dispenser holder located in the filter well with the dispenser holder supported proximal a first end and a second end of the filter cartridge and located proximate an exterior surface of the filter media but spaced from the exterior surface of the filter media so as to allow the recirculating water to flow through the filter media proximate the dispenser holder; and at least one dispensing cartridge removably attached to the dispenser holder with the dispensing cartridge containing a dispersant therein with an outlet of the dispensing cartridge located below the water line and spaced from the filter media to thereby deliver the dispersant therein into the recirculating water flowing through the filter media.

The dispenser holder of the invention contains numerous features were some or all of the following features may be used in a dispensing system including having: the dispenser holder support at least one dispensing cartridge between the filter cartridge and the water line; a pair of extensions located on opposing ends of the dispenser holder with each of the extensions having a mounting slot for securement to a corresponding filter cartridge mounting port in a snap-in manner; a set of filter cartridge mounting ports comprising a filter cartridge locating hub of the filter well and a male hub of the filter cartridge; mounting ports comprises a first mounting port and a second mounting port with the second mounting port having a smaller diameter than the first mounting port and including an end adapter releasable attachable to each of the mounting slot, the end adapter having at least one locking protrusion and each of the arms of the dispenser holder having at least one corresponding adapter receiving slot for engagement with the at least one locking protrusion to secure the end adapter to the mounting slot, the end adapter enabling the securement of the attached mounting slot to the second mounting port of the filter cartridge in a snap-in manner; an end adapter including at least one locking protrusion and each of the arms of the dispenser holder including at least one corresponding adapter-receiving slot for to secure the end adapter to the mounting slot; at least one dispenser supporting socket, the socket replaceably mounting the dispensing cartridge to the dispenser holder; dispensing cartridges located completely below the water line and spaced from the exterior surface of the filter media to thereby deliver a further dispersant into the recirculating water flowing through the filter media; dispensing cartridges each including at least one vent hole located on a top end of the cartridge, the vent hole enabling the dispensing of the dispersant therefrom; dispensing cartridges each including an oval-shaped body to allow for an insert and twist on installation to the dispensing cartridge socket of the dispenser holder; a rotatable dial located proximal a bottom end of the dispensing cartridge for controlling the ingress and egress of dispersant through the outlet of the dispensing cartridge; dispensing cartridges each including at least one window providing user access to the rotatable dial; dispensing cartridges each including a pair of diametrically opposing windows providing user access to the rotatable dial; dispensing cartridges each including at least one latch pocket located on an exterior surface of the dispensing cartridge and a dispensing cartridge supporting socket including at least one protrusion mateable with the corresponding latch pocket to secure the dispensing cartridge to the corresponding dispensing cartridge supporting socket; at least one dispensing cartridge having a pair of diametrically opposing latch pockets and the at least one alignment member comprises a pair of protrusions mateable with the latch pockets to secured the dispensing cartridge to the corresponding dispensing cartridge supporting socket; a pair of sloping or canted opposing side walls allowing for easy twist removal of the dispensing cartridge from the dispensing cartridge supporting socket in an opposite rotational directions; a plurality of outlet holes in the dispensing cartridge each including a standoff extending partially into an interior of the dispensing cartridge to prevent material blockage of the outlet holes; a sanitizing halogen and the further dispensing cartridge containing a mineral wherein the sanitizing halogens comprises one or combinations of chlorine, bromine, BCDMH, DCDMH, DCMEH, or Dantochlor; the sanitizing halogens comprise a mixture of DCDMH and DCMEH.

A further feature of the invention is a method of sanitizing a body of recirculating water by removing a top lid of a hot tub filter well having a filter cartridge located below a water line in a horizontal condition with the filter cartridge having a filter media therein for removing debris and bacteria from a recirculating water as the recirculating water flows through the filter media, mounting a dispenser holder within the filter well with the dispenser holder supported proximal a first end and a second end of the filter cartridge and located proximate an exterior surface of the filter media but spaced from the exterior surface of the filter media so as to allow the recirculating water to flow through the filter media proximate the dispenser holder; axially inserting at least one dispensing cartridge containing a dispersant into a dispensing cartridge-supporting socket of the dispenser holder; rotating the dispensing cartridge supported by the dispensing cartridge supporting socket towards locking engagement by engaging at least one latch pocket of the filter cartridge with a corresponding alignment member of the dispensing cartridge supporting socket to lock the dispensing cartridge to the dispensing cartridge supporting socket and covering the hot tub filter well with the top lid. The method may include some or all of the following steps: controlling the dispensing of the dispersant in the dispensing cartridge in the presence of recirculating water by adjusting the size of an adjustable outlet of the dispensing cartridge; mounting a dispenser holder within the filter well with the dispenser holder supported on a first end and a second end of the filter cartridge by mounting the dispenser holder to a filter cartridge mounting port located proximal each of the ends of the filter cartridge in a snap-in manner; removing the dispensing cartridge from the dispensing cartridge supporting socket by twisting the dispensing cartridge to disengage the latch pocket of the filter cartridge with the corresponding alignment member of the dispensing cartridge supporting socket and then axially removing the dispensing cartridge from the dispensing cartridge supporting socket.

The invention may further include a hot tub having a water chamber containing a body of recirculating water with the hot tub including: a filter well having a filter cartridge located below a water line in a horizontal condition with the filter cartridge having a filter media therein for removing debris and bacteria from the recirculating water as the recirculating water flows through the filter media with a dispenser holder located in the filter well with the dispenser holder supported proximal a first end and a second end of the filter cartridge and located proximate an exterior surface of the filter media but spaced from the exterior surface of the filter media so as to allow the recirculating water to flow through the filter media proximate the dispenser holder; and a first dispensing cartridge and a second dispensing cartridge replaceably supported by a pair of corresponding dispensing cartridge supporting socket located on the dispenser holder with the dispensing cartridges supported between the filter cartridge and the water line, the dispensing cartridges each containing a dispersant therein with an outlet of the dispensing cartridges located below the water line and spaced from the filter media to thereby deliver the dispersant therein into the recirculating water flowing through the filter media. Other features which may be included are a pair of extensions located on opposing ends of the dispenser holder with each of the extensions having a mounting slot for securement to a corresponding filter cartridge mounting port located proximal each of the ends of the filter cartridge in a snap-in manner; the filter cartridge mounting ports comprising a filter cartridge locating hub of the filter well and a male hub of the filter cartridge; an end adapter releasably attachable mounting slots, the end adapter enabling the mounting slots to secure the male hub of the filter cartridge in a snap in manner; mounting ports comprises a first mounting port and a second mounting port with the second mounting port having a smaller diameter than the first mounting port and including an end adapter releasably attachable to each of the mounting slot, the end adapter having at least one locking protrusion and each of the arms of the dispenser holder having at least one corresponding adapter receiving slot for engagement with the at least one locking protrusion to secure the end adapter to the mounting slot, the end adapter enabling the securement of the attached mounting slot to the second mounting port of the filter cartridge in a snap on manner; the dispensing cartridges each including at least one vent hole located on a top end of the cartridge, the vent hole enabling the dispensing of the dispersant therein through the flow of water therethrough; the dispensing cartridges each including an oval-shaped body to allow for an insert and twist installation to the dispensing cartridge supporting socket of the dispenser holder; the dispensing cartridges each including a rotatable dial located proximal a bottom end of the cartridge for controlling the ingress and egress of dispersant through the outlet of the dispensing cartridge; the dispensing cartridges each including at least one window providing user access to the rotatable dial; the dispensing cartridges each including a pair of diametrically opposing windows providing user access to the rotatable dial; dispensing cartridges each including at least one latch pocket located on an exterior surface of the dispensing cartridge and the dispensing cartridge supporting socket including at least one alignment member mateable with the corresponding latch pocket to secure the dispensing cartridge to the corresponding dispensing cartridge supporting socket; at least one latch pocket comprising a pair of diametrically opposing latch pockets and the at least one alignment member comprises a pair of corresponding alignment members mateable with the latch pockets to secure the dispensing cartridge to the corresponding dispensing cartridge supporting socket; the latch member includes a pair of sloping opposing side walls allowing for easy twist removal of the dispensing cartridge from the dispensing cartridge supporting socket in opposite rotational directions; the outlet of the dispensing cartridge comprising a plurality of outlet holes with the plurality of outlet holes each including a standoff extending partially into an interior of the dispensing cartridge to prevent material blockage of the outlet holes.

The invention may further comprises a hot tub dispenser holder having an attachment member removably securable to at least one mounting port located proximal an end of a filter cartridge supported below a water line in a horizontal condition within a hot tub filter well, the attachment member supporting the dispenser holder proximate an exterior surface of a filter media of the filter cartridge but spaced from an exterior surface of the filter media so as to allow a recirculating water to flow through the filter media proximate the dispenser holder; and at least one dispensing cartridge supporting socket for removably supporting a dispensing cartridge containing a dispersant therein below the water line and spaced from the filter media; the attachment member comprises a pair of arms located on opposing ends of the dispenser holder with each of the arms having a mounting slot securable to a corresponding filter cartridge mounting port located proximal each of the ends of the filter cartridge in a snap-in manner; mounting slots on a pair of radial offset arms are securable to a filter cartridge-locating hub of a filter well and a male hub of a filter cartridge; a first mounting port and a second mounting port with the second mounting port having a smaller diameter than the first mounting port and including an end adapter releasably attachable to mounting slots, the end adapter having at least one locking protrusion and each of the arms of the dispenser holder having at least one corresponding adapter receiving slot for engagement with the at least one locking protrusion to secure the end adapter to the mounting slots, the end adapter enabling the securement of the attached mounting slots to the second mounting port of the filter cartridge in a snap on manner and the dispensing cartridge-supporting socket including at least one alignment member mateable with a latch pocket located on an exterior surface of the dispensing cartridge to secure the dispensing cartridge to the dispensing cartridge supporting socket.

Figure 29:
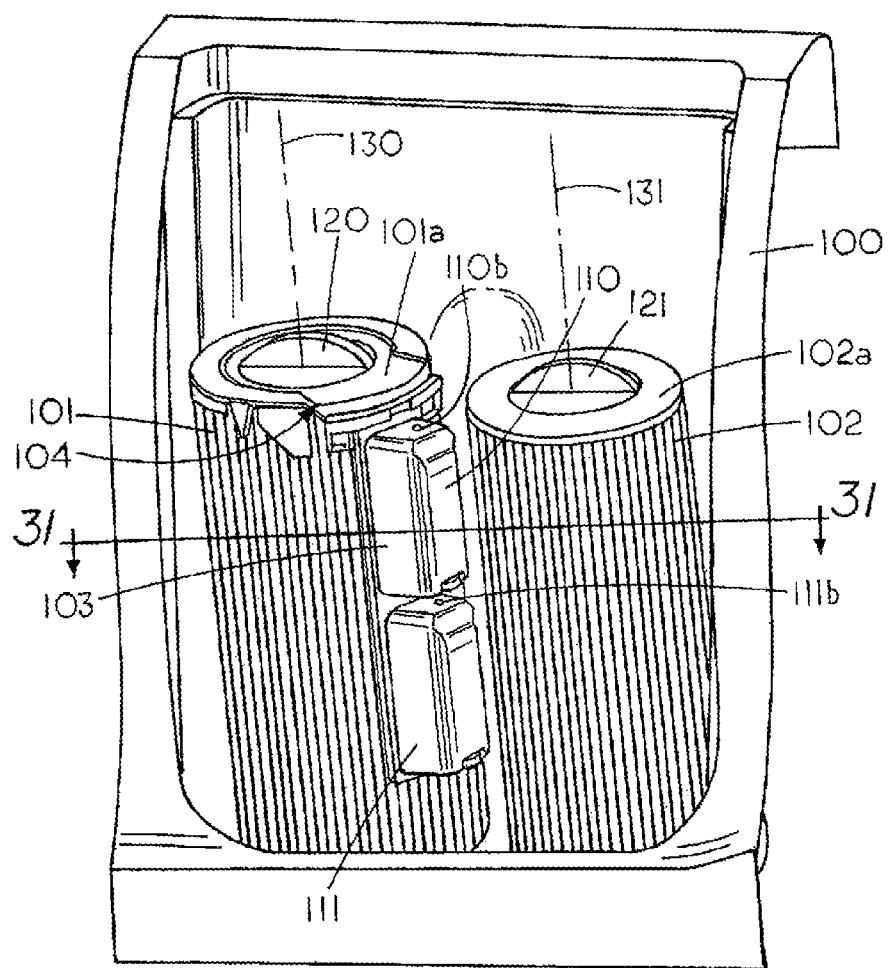
FIG. 29 is an isolated front view of a filter well with a pair of vertically positioned filter cartridges having a filter well dispenser holder secured thereto.

FIG. 29 is an isolated front view of a hot tub filter well 100 that is an integral component of a hot tub. In this example the hot tub filter well 100 includes a first vertically positioned filter cartridge 101 with a vertical axis 130 having an end cap 101*a* located in a side by side relation to a second vertically positioned filter cartridge 102 with a vertical axis 131 having an end cap 102*a*, which may be used to rotate the filter into proper position. In this example a rigid dispenser holder 104 is proximate only one of the two side by side filter cartridges 101 and 102 with the dispensing cartridges located in vertical alignment and on stacked above each other with each other as opposed to the dispensing cartridges shown in FIG. 2.

Figure 30:
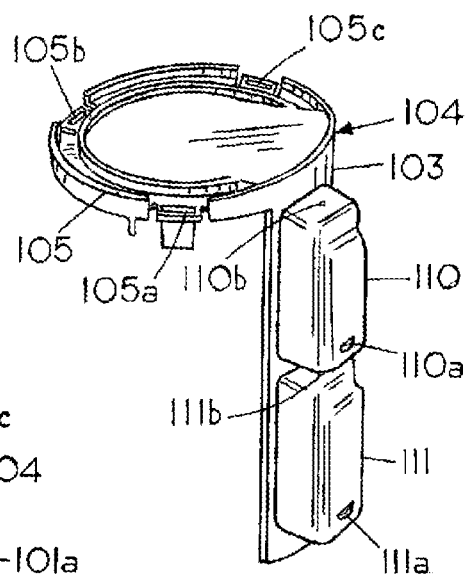
FIG. 30 is an isolated perspective view of the dispenser holder of FIG. 29 with dispensing cartridges axially positioned proximate the filter media of one of the vertically positioned filter cartridges.
Figure 30A:
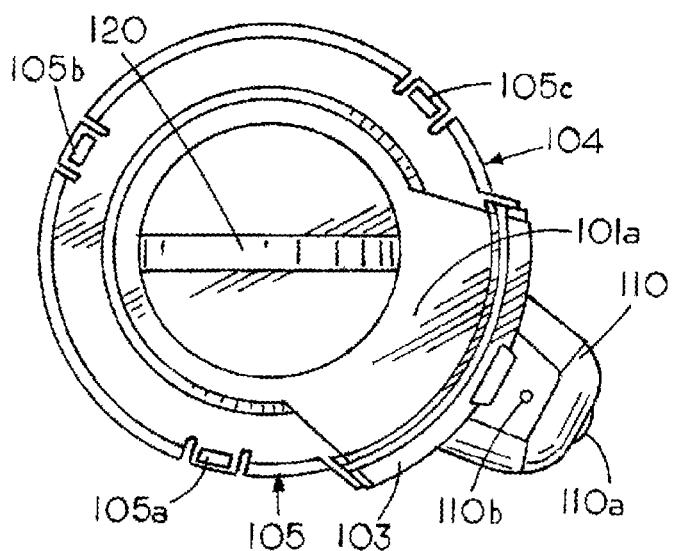
FIG. 30A is a top view of a dispenser holder of FIG. 30 secured to an end cap of a filter cartridge.
Figure 30B:
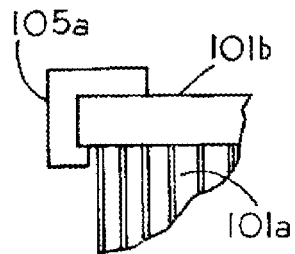
FIG. 30B is an isolated view of one of the latches that secures the dispenser holder of FIG. 30 to the end cap of a filter cartridge.

FIG. 30 is a perspective view of the underwater dispenser holder 104 that is attachable to the end cap 101a of filter cartridge 101 or the end cap 102a of filter cartridge 102 without modifications to the filter well or the filter cartridges therein and FIG. 30A is a top view of the cap mountable dispenser holder 104 on filter cartridge 101. The dispenser holder 104, which is shown in perspective in FIG. 30 and front view in FIG. 33, comprises an L-shaped rigid base that includes an annular top base 105 that fits into latching engagement with the top and peripheral edge of filter cap 101a and an elongated side base 103 with the elongated side base 103 extending longitudinally proximate filter media 102a as shown in FIG. 29. In this example the cap mountable dispenser holder 104 elongated side base 103 is cantileverly secured at a right angle to annular top base 105 to form a rigid one piece structure for holding a first replaceable dispensing cartridge 110 and a second replaceable dispensing cartridge 111 in a dispensing condition thereon. As shown in FIG. 29 and FIG. 30A elongated side base 103 extends at a right angle from filter cap 101a when annular top base 105 is mounted on end cap 101a of filter cartridge 101 through latches 105a, 105b and 105c. FIG. 30B is an isolated view of a resilient L-shaped cap latch 105a that snaps over the edge of end cap 101a. A second L-shaped cap latch 105b and a third resilient L-shaped cap latch 105c also snap over the edge of the end cap with the three latches coacting to hold the dispenser holder 104 in a fixed position on filter cartridge 101. While snap over latches are shown other methods of attaching the holder to the cartridge may be used without departing from the sprit and scope of the invention.

Figure 31:
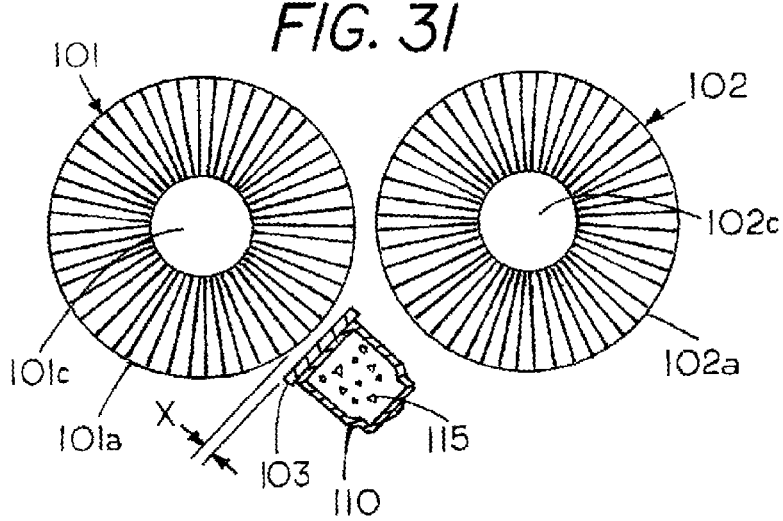
FIG. 31 is a sectional view of the dispensing cartridges of FIG. 29 taken along lines 31-31 of FIG. 29.

FIG. 31 is a sectional view taken along lines 31-31 of FIG. 29 revealing the elongated side base 103 spaced a distance x from an exterior surface of filter media, with the distance x sufficient so that water can flow into the region between the elongated side base 103 and the filter media, which is located radially inward from elongated base 103. Thus, the cap mounted dispenser holder 104 is similar to dispenser holder 13 and dispenser holder 51 as it does not prevent water from flowing through the filter media 101 proximate base 103, which could reduce the effectiveness of the filter cartridge by reducing the filter media available for debri removal. Dispenser holder 104 as well as the dispenser holder 23 shown in FIG. 4A and the dispenser holder 51 shown in FIG. 17 also include this feature. That is each of the dispenser holders described herein can be positioned so as not to reduce the effective filtering area of the filter media thereby not decreasing the life expectancy of the filter cartridge.

In some applications a reduction in a portion of the filter media filtering may not significant, in those cases the invention described herein may also be used by placing the dispenser holder base in contact with the filter media. Thus, a feature of the invention is that it provides flexibility for mounting under different flow conditions.

FIG. 29 shows that the dispensing cartridge 110 and the dispensing cartridges 111 are held in vertically alignment proximate the filter media 101a. Dispensing cartridge 110 includes a top vent 110b and a rotatable wheel 110a for controlling the open area for water to enter dispensing cartridge 110. Similarly, dispensing cartridge 111 includes a vent 111b and a rotatable wheel 111b for controlling water entry into the dispenser 111. Thus the various examples of dispensing cartridges described herein can be attached or removed from a dispenser holder and each of the dispensing cartridges are mounted proximate an exterior surface of a pleated filter media of a filter cartridge where the filter cartridge may be mounted in the filter well of a hot tub or the like.

Figure 32:
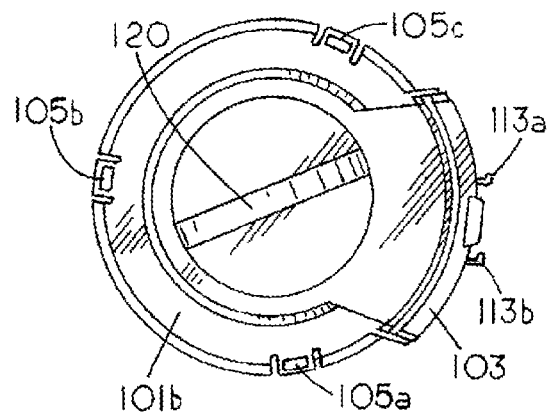
FIG. 32 is a top view of a dispensing holder secured to a filter cap with a set of three cap latches.
Figure 33:
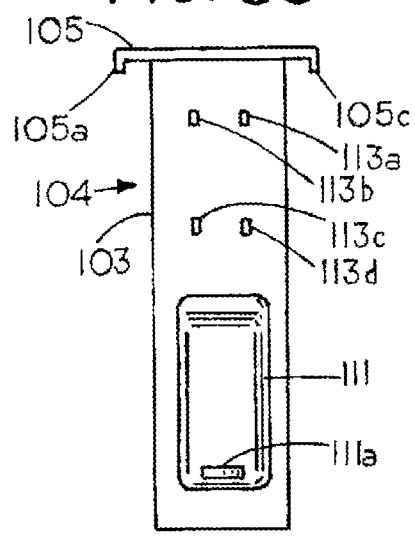
FIG. 33 is a front view of the elongate base of dispenser holder of FIG. 30 with one of the dispensing cartridges removed.
Figure 34:
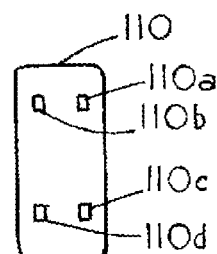
FIG. 34 is a back view of a dispensing cartridge revealing sockets for frictionally engaging pins on the dispenser holder.

FIG. 33 shows a front view of elongated base 103 revealing that one of the two dispensing cartridge has been removed from base 103 while dispensing cartridge 111 remains attached to base 103. In this example base 103 includes a set of four pins 113a, 113b, 113c and 113d that can be frictionally engaged with sockets 110a, 110b, 110c and 110d of dispensing cartridge 110, which are shown in FIG. 34, to allow dispensing cartridge 110 to be attached or removed from elongated base 104 through hand engagement of dispensing cartridge 110. FIG. 32 is a top view of dispenser holder 104 showing latching pins 113a and 113b on elongated base 103 that are used to attach and remove dispensing cartridges therefrom. Similarly, dispensing cartridge 111 is removably attached to a set of identical socket and pins although other methods of removably attachment of the dispensing cartridges to the base member may be used, for those shown in FIG. 6 and FIGS. 26, 27 and 28. While underwater dispensing holder is mountable below the water line the dispensing holder may be located partially or wholly above the water line as long as the dispensing cartridges thereon can deliver a disperant to the water flowing through the filter well.

A feature of the invention described herein is that the dispensing cartridges as a group can be positioned in a region of stable or constant flow proximate the filter media as opposed to placement in turbulent flow that can occur in other portions of the filter well, which may cause an unwanted change in the dispensing rate from the cartridge without a change of settings on the dispensing cartridge.

We claim:

1. A hot tub having a water chamber containing a body of recirculating water with the hot tub including:
a seating area;
a filter well having a cylindrical filter cartridge located below a water line in the hot tub with the cylindrical filter cartridge having a filter media for removing debris and bacteria from the recirculating water as the recirculating water flows radially inward through the filter media;
a dispenser holder located in the filter well with the dispenser holder having a base supported proximate an end of-a the filter cartridge with a face of the base spaced from but proximate an exterior surface of the filter media to form a gap therebetween sufficiently large so as to allow the recirculating water to flow into the gap and through the filter media proximate the dispenser holder;
a dispensing cartridge removably attached to the dispenser holder with the dispensing cartridge containing a dispersant therein with an outlet of the dispensing cartridge located below the water line and spaced from the filter media to thereby deliver the disperant therein into the recirculating water flowing through the filter media; and
a further dispensing cartridge removably attached to the dispenser holder with the further dispensing cartridge located below the water line and spaced from the exterior surface of the filter media to thereby deliver a further disperant into the recirculating water flowing through the filter media with the dispensing cartridge and the further dispensing cartridge extending partially along the filter media and at least one of the dispensing cartridges contains a halogen.

2. The hot tub of claim 1 wherein the dispenser holder includes a resilient yoke snapably engageable with a one end of the dispensing cartridge.

3. The hot tub of claim 1 where the filter well is an integral component of the hot tub.

4. The hot tub of claim 1 where the filter well is coupled to a recirculating water system that circulates water through the filter well.

5. The hot tub of claim 1 wherein a water line of the filter well and the water line of the hot tub are the same.

6. The hot tub of claim 1 wherein the cylindrical filter cartridge is mounted vertically in the filter well.

7. A hot tub having a water chamber containing a body of recirculating water with the hot tub including:
a seating area;
a filter well having a cylindrical filter cartridge located below a water line in the hot tub with the cylindrical filter cartridge having a filter media for removing debris and bacteria from the recirculating water as the recirculating water flows radially inward through the filter media;
a dispenser holder located in the filter well with the dispenser holder having a base supported proximate an end of the filter cartridge with a face of the base spaced from but proximate an exterior surface of the filter media to form a gap therebetween sufficiently large so as to allow the recirculating water to flow into the gap and through the filter media proximate the dispenser holder;
a dispensing cartridge removably attached to the dispenser holder with the dispensing cartridge containing a dispersant therein with an outlet of the dispensing cartridge located below the water line and spaced from the filter media to thereby deliver the disperant therein into the recirculating water flowing through the filter media; and
a further dispensing cartridge removably attached to the dispenser holder with the further dispensing cartridge located below the water line and spaced from the exterior surface of the filter media to thereby deliver a further disperant into the recirculating water flowing through the filter media wherein the dispensing cartridge and further dispensing dispenser holder contour the filter cartridge and the filter well to avoid interference of movement of a weir door to the filter well.

8. A hot tub having a water chamber containing a body of recirculating water with the hot tub including:
a seating area;
a filter well having a cylindrical filter cartridge located below a water line in the hot tub with the cylindrical filter cartridge having a filter media for removing debris and bacteria from the recirculating water as the recirculating water flows radially inward through the filter media;
a dispenser holder located in the filter well with the dispenser holder having a base supported proximate an end of the filter cartridge with a face of the base spaced from but proximate an exterior surface of the filter media to form a gap therebetween sufficiently large so as to allow the recirculating water to flow into the gap and through the filter media proximate the dispenser holder; and
at least one dispensing cartridge removably attached to the dispenser holder with the dispensing cartridge containing a dispersant therein with an outlet of the dispensing cartridge located below the water line and spaced from the filter media to thereby deliver the disperant therein into the recirculating water flowing through the filter media wherein the at least one dispensing cartridge has a concave side surface and the cylindrical filter cartridge has a convex surface with lateral arcuate spacing therebetween.

* * * * *